(12) United States Patent
Mulvihill

(10) Patent No.: US 9,771,699 B2
(45) Date of Patent: Sep. 26, 2017

(54) RETENTION DEVICE

(71) Applicant: Michael Mulvihill, Manchester (GB)

(72) Inventor: Michael Mulvihill, Manchester (GB)

(73) Assignee: EEXTREME GLOBAL LIMITED, Lancashire (GB)

( * ) Notice: Subject to any disclaimer, the term of this patent is extended or adjusted under 35 U.S.C. 154(b) by 0 days.

(21) Appl. No.: 14/357,459

(22) PCT Filed: Oct. 21, 2013

(86) PCT No.: PCT/GB2013/000448
§ 371 (c)(1),
(2) Date: May 9, 2014

(87) PCT Pub. No.: WO2014/064404
PCT Pub. Date: May 1, 2014

(65) Prior Publication Data
US 2014/0308078 A1 Oct. 16, 2014

(30) Foreign Application Priority Data

Oct. 23, 2012 (GB) .................................. 1218990.8
Jan. 7, 2013 (GB) .................................. 1300213.4

(51) Int. Cl.
*E02B 7/00* (2006.01)
*E02B 5/08* (2006.01)
*E02B 3/10* (2006.01)

(52) U.S. Cl.
CPC .................................. *E02B 3/106* (2013.01)

(58) Field of Classification Search
CPC ... E02B 7/20; E02B 3/102; E02B 7/26; E02B 3/106; E02B 5/082; E02B 7/42; E02B 9/027

USPC ........ 405/71, 80, 81, 82, 83, 84, 85, 86, 87, 405/90, 92, 91, 94, 95, 99, 100, 107, 113, 405/114, 115, 116, 117; 14/71, 80, 81, 14/82, 83, 84, 85, 86, 87, 90, 92, 91, 94,
(Continued)

(56) References Cited

U.S. PATENT DOCUMENTS

| 1,841,747 A | * | 1/1932 | Lun .......................... E02B 7/44 |
| | | | 405/102 |
| 1,938,675 A | * | 12/1933 | Young ....................... E02B 7/46 |
| | | | 405/101 |

(Continued)

FOREIGN PATENT DOCUMENTS

| CN | 101 115 883 A | 1/2008 |
| DE | 3527100 | 7/1985 |

(Continued)

*Primary Examiner* — Benjamin Fiorello
*Assistant Examiner* — Edwin Toledo-Duran
(74) *Attorney, Agent, or Firm* — Klintworth & Rozenblat IP LLP

(57) ABSTRACT

According to the present invention there is provided a liquid retention device comprising: a braced frame mountable on foundations in a plurality of locations, in which said device comprises a base section and at least one upstanding support, and in which said brace further comprises height-adjusting means for adjusting the height of said frame, and in which said device further comprises a face supported by said frame, in which said face is inclined at an angle to the at least one upstanding support, wherein said face is covered by a least one detachable mat.

25 Claims, 22 Drawing Sheets

(58) Field of Classification Search
USPC ..... 14/95, 99, 100, 107, 113, 114, 115, 116, 14/117
See application file for complete search history.

(56) References Cited

U.S. PATENT DOCUMENTS

| | | | | |
|---|---|---|---|---|
| 2,108,065 A * | 2/1938 | Kotrbaty | ............... | E04B 1/24 52/11 |
| 2,434,457 A * | 1/1948 | Cruikshank | ............... | E02B 7/20 405/107 |
| 2,485,755 A * | 10/1949 | Loosli | ............... | E02B 13/00 405/106 |
| 2,617,263 A * | 11/1952 | Hill | ............... | E02B 7/42 405/100 |
| 3,807,120 A * | 4/1974 | Viandon | ............... | E04G 1/22 182/178.5 |
| 4,114,381 A * | 9/1978 | Lundh | ............... | E02B 7/205 405/101 |
| 4,455,106 A * | 6/1984 | Johnson | ............... | E02B 7/44 405/101 |
| 4,657,434 A * | 4/1987 | Woolnough | ............... | E02B 7/44 405/100 |
| 4,877,352 A * | 10/1989 | Tuttle | ............... | G05D 9/02 405/100 |
| 4,921,373 A * | 5/1990 | Coffey | ............... | E02B 7/16 256/13 |
| 5,178,490 A * | 1/1993 | Snowberger | ............... | E02B 7/44 405/100 |
| 5,199,812 A * | 4/1993 | McClellan | ............... | E02B 7/44 405/101 |
| 5,222,834 A * | 6/1993 | Schultz | ............... | E02B 7/44 405/102 |
| 5,310,284 A * | 5/1994 | Snowberger | ............... | E02B 7/44 405/102 |
| 5,433,555 A * | 7/1995 | Parizot | ............... | E02B 7/44 405/100 |
| 5,592,702 A * | 1/1997 | Gillebaard, Jr. | ...... | E04H 4/0056 4/506 |
| 5,709,502 A * | 1/1998 | Obermeyer | ............... | B60C 15/02 405/114 |
| 5,713,699 A * | 2/1998 | Obermeyer | ............... | E02B 7/005 405/115 |
| 5,758,989 A * | 6/1998 | Snowberger | ............... | E02B 7/44 405/100 |
| 5,826,397 A * | 10/1998 | Arnold | ............... | G09F 15/0068 52/641 |
| 6,042,301 A | 3/2000 | Sovran | | |
| 6,840,711 B1 * | 1/2005 | Martinez | ............... | E02B 3/106 405/107 |
| 7,815,397 B1 * | 10/2010 | Dung | ............... | E02B 3/102 405/104 |
| 7,997,828 B2 * | 8/2011 | Rijlaarsdam | ............... | E02B 3/102 256/13 |
| 2003/0143027 A1 * | 7/2003 | Obermeyer | ............... | E02B 3/102 405/115 |
| 2003/0156903 A1 * | 8/2003 | Wiseman | ............... | E02B 3/106 405/115 |
| 2006/0124913 A1 | 6/2006 | Keedwell | | |
| 2007/0237585 A1 * | 10/2007 | Frantz | ............... | E02B 3/102 405/107 |
| 2009/0169306 A1 * | 7/2009 | Rijlaarsdam | ............... | E02B 3/102 405/114 |
| 2012/0163917 A1 * | 6/2012 | Waters, Jr. | ............... | E02B 3/102 405/114 |

FOREIGN PATENT DOCUMENTS

| | | | | |
|---|---|---|---|---|
| DE | 240688 | | 1/1988 | |
| DE | 8 808 124 U1 | | 10/1988 | |
| DE | 102008009519 | | 6/2009 | |
| EP | 1273712 A1 * | | 1/2003 | |
| GB | 2423110 A | | 8/2006 | |
| GB | 2465005 | | 5/2010 | |
| GB | 2465005 A * | | 5/2010 | ............ E02B 3/102 |
| JP | 5 113 061 | | 5/1993 | |
| JP | 11 509 283 | | 8/1999 | |
| JP | 2002 357 024 | | 12/2002 | |
| JP | 2008 088 791 | | 4/2008 | |
| SK | 50232013 U1 | | 1/2014 | |
| SU | 640289 | | 1/1981 | |
| WO | 9 704 177 A1 | | 2/1997 | |
| WO | WO2004/044334 | | 5/2004 | |
| WO | WO2010/130406 | | 11/2010 | |

\* cited by examiner

RETENTION DEVICE

FIELD OF THE INVENTION

The present invention relates to a retention device, more particularly but not exclusively a retention device for flood waters, river banks, pond and holding tanks, snow banks, and earthen embankments.

BACKGROUND

Flooding is a considerable risk to many places around the world. In particular as large amounts of housing have been built in areas previously designated as flood plains, creating large numbers of properties that are at considerable risk should there be a significant influx of water.

In addition to this weather extremes often mean that unprecedented events such as deluges of rain will happen at some point and some studies suggest such incidents are on the rise in the world. Although a permanent flood prevention structure may not be necessary, temporary structures are required so as to be able to mitigate potential risks.

Traditionally sand bags are a common means of creating a reliable temporary barrier. However, access to these may be limited and the amount available may not be sufficient for a sudden demand. Also if larger areas are to be protected such as riversides such means may not be practical.

Permanent structures such as barrier walls may be put in place, however such means are costly to input and typically are not wanted for potential risks such atypical year flood risks, but instead only for recurring and known risks.

The present invention arose to overcome the problems associated with water defence systems and by providing a temporary quick to construct barrier that may be adjusted in situ.

PRIOR ART

Accordingly a number of patent applications have been filed in an attempt to resolve the problem or similar, including the following:

Granted German patent DE 102 008 009 519 (KESSELS et al) discloses a barrier i.e. flood protective wall, that has multiple columns arranged in a longitudinal direction of the barrier in a distributed and spaced to each other manner, where the columns support a flexible waterproof membrane. The columns are anchored in earth. The membrane has an edge strip that extends over an entire length of the barrier. The edge strip is attached to the earth in a sealing and load-carrying manner. The columns are fixedly connected with the waterproof membrane and anchored in the earth about a swivel axis in a rotatable and articulated manner. The membrane is made of a plastic or natural rubber material such as styrene-butadiene rubber (SBR) and ethylene propylene diene M-class rubber, where a reinforcement filler contains a glass fiber, plastic fiber, or metal wires.

Granted United Kingdom patent GB 2 423 110 (DURRANCE) discloses a flood defence barrier comprising: a body having a convex surface for facing flood water and a concave surface for facing the interior of a building, the convex surface being bounded by a pair of generally parallel side edges; and a base in the form of a flange joined at its leading edge to the body and extended from the body in the direction towards the interior of the building.

Granted U.S. Pat. No. 7,997,828 (RIJLAARSDAM) discloses a retaining wall device, comprising at least a first retaining wall member and a support for it, wherein the first retaining wall member and the support have first and second longitudinal edges, respectively, extending in longitudinal direction of the retaining wall, which longitudinal edges have been formed for connection to each other by a tilting or rotary motion about one or several axes that are parallel to the longitudinal edges, wherein the longitudinal edge that is opposite the first longitudinal edge of the first retaining wall member is designed at least partially corresponding to the second longitudinal edge for connection by the tilting or rotary motion.

German patent application DE 3 527 100 (DER ERFINDER) discloses a device for protection against highwater consisting of a supporting frame anchored to the ground and at least one flexible material web holding back high-water, which flexible material web has a sealing strip at each of its longitudinal sides and is coated with a water-impermeable plastics coating. This coated material web consists of a woven or non-woven fabric provided with a layer of plastic or elastomer and has in the longitudinal and/or transverse direction a tear propagation resistance of at least 100 daN and a maximum tensile force of at least 600 daN/5 cm. As a result of these high values, folding at the edges and thus the formation of concentrated loads can be effectively suppressed.

DE102008009519 (Floecksmuchle Energietechnik) Relates to a flood wall. It comprises a membrane and a support structure so that the flood wall is mobile and the support structure can also be permanently attached to the ground.

DE35272100 (Mehler) Reveals a means for protection against high water comprising a ground anchored scaffold with a water-retaining flexible web of material.

In contrast the present invention provides a solid dependable and adaptable means of preventing movement of flood water in particular.

SUMMARY OF THE INVENTION

According to the present invention there is provided a retention device for retaining movement of free flowing substances, comprising: a face section providing a wall to retain free movement of flowing substances, the face section being connected substantially perpendicular to a base mounted on a foundation anchor and being height adjustable relative to the base, and a length adjustable angled portion for bracing the face section against force applied by free flowing substance to the face section, the angled portion being pivotally connected between the face section and the base by hinges so that when the height of the face section is adjusted, the brace pivots and the length is adjusted to accommodate the adjusted height of the face section.

Preferably the retention device comprises: a braced frame mountable on foundations in a plurality of locations, in which said device comprises a base section and at least one upstanding support, and in which said brace further comprises height-adjusting means for adjusting the height of said frame, and in which said device further comprises a face supported by said frame, in which said face is inclined at an angle to the at least one upstanding support, wherein said face is covered by a least one detachable mat.

Preferably face section comprises a mat and suspension means near the top of the face section from which to hang the mat as a curtain suitable as a wall against liquids and other free flowing materials. Preferably the mat is attachable to the face section by suspension means, and the suspension means also permits the mat to be detached from the face section.

More particularly the device forms part of a system comprising:

- a plurality of adjustable frames, each frame being arranged to accept at least one barrier,
- at least one barrier arranged to fit within a frame and arranged in use to extend into the ground;
- at least one adjustable brace to support the at least one barrier and the plurality of frames;
- a plurality of foundations arranged in use to secure the frames to the ground;
- at least one extendable mat;
- and a plurality of clamps arranged to secure the at least one extendable mat to a frame;
- wherein at least one frame is arranged to be interconnected to another frame by a hinge.

In preferred embodiments the foundations are spikes driven or screwed into the ground. Preferably the foundations are self-tapping screw-threads or augers that may be drilled into the ground so as to provide secure grounding for the frame without requirement for concrete or similar setting solution. Such augurs are ideally designed to displace, compact and/or grip the ground as they are screwed, and consequently provide secure vertical foundations with disinclination to tip or move horizontally.

In other embodiments, such as where the ground is formed from hard solids such as rock, holes may be pre-drilled before insertion of the foundation.

Most preferably the frame has a square or rectangular shaped base section. The foundations may be included at each corner. It is envisaged that the size of the foundations is proportional to the device size, and potential amount of liquid to be held or retained.

Ideally each foundation includes a bracket that is secured to the frame once the foundation has been positioned in the ground wherein at least one, preferably two, attachment means for example screws or pins are used to connect the bracket to the frame. Preferably the frame may include pre-drilled holes to accept the attachment means for example screws or pins.

In some embodiments a plurality of pre-drilled holes for brackets may be provided by the frame so that the frame may be adjusted in use after the foundations have been positioned in the ground, by repositioning where the bracket attaches to the brace, for example if the water level rises.

In preferred embodiments the frame has a generally square or rectangular cross-section. The frame may have a base section with upstanding supports extending from the base section. The upstanding supports may provide a generally square or rectangular support section. The height of the frame, for example the height of the upstanding supports, may be adjustable so as to provide the water defence system relevant to anticipated water level. Jacking and/or telescopic parts may be provided.

Preferably the frame is formed from a strong, durable, load bearing material such as metal, for example steel. Ideally the metal is treated so as to prevent corrosion for example the frame may be galvanised.

In preferred embodiments the frame is formed of two layers, for example the upstanding supports of the frame may be formed of two layers, a front support and a back support so that the frame, for example the upstanding supports of the frame, provide at least one channel shaped and dimensioned to receive at least a portion of the barrier. The barrier may be slotted between the frame layers so that the frame supports the barrier. For example, the edges of the barrier may be slotted into the channels provided by the upstanding supports of the frame so that the frame supports the barrier. Typically the two layers are similar or identical being joined parallel to one another with a slot to accept the barriers. The frame thereby in preferred embodiments enables a multi-layer, flexible arrangement adaptable for accommodation of flowing water, able to be arranged to accommodate and limit flow through the device and a plurality of said devices. The frames in plural combination provide further flexibility with parts arrangeable to prevent flow of water even between frames.

Ideally the barriers slots between the front and back layers. The barrier is preferably planar and traverses the frame's height, extending into the ground, thereby providing structural strength against the fluid or flood water. Such barriers may also be used between frames.

Typically the barriers are formed from strong, durable materials such as synthetic plastics such as high density polyethylene (HDEP), sheet material, Larsen piles or treated timber. Ideally the barrier is interlocking so as to make the device water resistant or impermeable. Preferably the barriers may link by tongue and groove means thereby allowing the barriers to be slotted in alongside one another between the layers.

Insertion of the barriers into the frame creates the device that will assist in preventing passage of water. In some embodiments the tongue and groove portion of the foundations may include a resiliently deformable material such as rubber or silicone so reduce likelihood of water ingress.

Preferably the frame base section and upstanding supports are comprised from square tubular portions. This enables the barrier(s) to fit flush to the frame when slotted into the frame. The height of the upstanding supports may be adjusted by a height adjustment means as necessary depending on the depth of the water the device is to retain. Ideally the frame upstanding supports are screw jack poles that may be extended and retracted to alter frame height. Preferably the device height is variable being variable from not less than 1 m and to typically no greater than 13 m.

In preferred embodiments the frame is variably or adjustably supported by a brace so as to enable the device to bear weight on the face. Preferably the brace includes a strut extending parallel to the frame base and in which the strut cooperates with an angled portion so as to join the horizontal strut to the frame upstanding supports or face, thereby forming a triangular arrangement.

Ideally the strut joins the angled portion by means of a hinge and/or the triangular arrangement and wherein in addition or the alternative both the strut and portion are adjustable, typically such as being screw jack poles. Both said strut and said angled portion are ideally provided with structurally strengthened internal or external screw thread adjustment means.

Ideally the brace includes a stress bearing section which acts to improve load bearing properties of the brace enabling dimensions of the brace and frame to be adjusted without requirement for additional parts.

Preferably such stress bearing section is an inverted triangle or triangular shaped arrangement in use, positioned between the frame upstanding supports or face and the angled portion and combining with the strut so as to typically form the brace. The stress bearing section has two weight bearing plates leading from the strut and angled portion and supporting the frame and brace with a link joining both plates to form and join the triangle.

Advantageously so as to provide adjustment or variation of the frame the stress bearing section may be adjustable, wherein the two plates may be hinged together so as to alter plate angles. In order to accommodate altered angles the third link is adjustable in length wherein the link has a plurality of settings so that length may be changed to accommodate altered angles.

Typically length of the third link may be changed by repositioning where on the third link the link attaches to the plates. Preferably the link is formed of two strips, attached to each side of the plates. The strips may be fixedly attached by a pivot one end and removably attached to the strips' distal end. Ideally each strip includes a plurality of apertures which may be aligned with an aperture on the plate side and then held in position by a pin.

Preferably only the plate accepting the angled portion is adjustable so as to allow the angled portion to always be accepted perpendicular to the platform, yet permit the strut to be at different heights.

In some embodiments the stress-bearing section may be a hinged block attached to the frame upstanding supports that may pivot so as to accept the brace or remainder of the brace at various angles.

It is envisaged that the location of the stress-bearing section may be changed. For example, in some embodiments the stress-bearing section may be positioned between the horizontal strut and angled portion.

In preferred embodiments the frame upstanding supports may include a plurality of projections that are dimensioned to be received within apertures in the mat. The mats are preferably flexible, durable heavy duty rubber sheets typically sized to cover the wall frame thereby providing a continuous shield over the device or frame.

The apertures in the mat enable it to be positioned over the projections of the frame and hung over the device so as to form a shield. It is envisaged there may be a holding system so as to hold the mat in place on the projection, preventing the mat from lifting off such as a cap or cross section bolt that may be screwed into the projection.

Preferably the frame may also house clamps which assist in holding the piles in position and may also act to receive a secondary flexible cover along the frame length preventing lifting of the cover. In particular where one frame may be joined to another creating a corner the clamps may shape and secure the cover so as create a watertight seal.

Ideally one cover may distally attach to another so as to increasing the length of the matting if the frame height is increased. It is envisaged that the covers may include tongue and grooved areas so as to join one mat to another either side by side or in parallel to increase length.

Preferably the retention device comprises an elevation adjustment means for adjusting the relative elevation and orientation of the face section with respect to the foundation anchor. Ideally the elevation adjustment means is a screw jack connecting the base to the foundation anchor.

Preferably the face section comprises: a bottom horizontal bar fixed to the base, a top horizontal bar aligned substantially parallel to the bottom horizontal bar, and lateral sides comprising upstanding supports which are length adjustable and connected between the top horizontal bar and the bottom horizontal bar so as to make the face section height adjustable by adjusting the length of the upstanding supports.

Preferably the retention device comprises a barrier suitable as a wall against liquids and loose stuffs, wherein the face section comprises a channel for receiving and supporting the barrier. Ideally the barrier is comprised of slats, or webbing, or a solid plate, or other suitable barrier for the free flowing material to be retained. For example if the free flowing material is liquid then the barrier is preferably impermeable to liquid, and if the free flowing material is soft mud then the barrier is preferably such that it can retain the soft mud.

Preferably the face section has lateral sides comprising a means for grasping an edge of a cover that is flexible and suitable for an expansion joint.

Preferably one frame may join to another frame by means of hinges thereby enabling creation of a longer device or a system comprising a plurality of retention devices, for example to span a river wall and wherein the extendable plates may span gaps between the frames. Alternatively the device may be connected at angles so as to form a closed unit to hold water, for example a pond or pool.

Ideally the system comprising a plurality of retention devices is arranged so that the face section of each retention device has a lateral side arranged substantially parallel with and joined to a lateral side of an adjacent face section. Preferably each retention device comprises an elevation adjustment means for adjusting the relative orientation of the lateral side with respect to the foundation anchor so as to arrange the lateral side substantially parallel with a lateral side of an adjacent face section. Ideally the lateral sides of adjacent face sections are separated by a gap and the lateral sides are joined by an expansion joint comprising a cover in the form of a flexible sheet that covers the gap.

Advantageously a system may comprise adjacent face sections that when arranged substantially parallel to each other form a substantially straight section of a wall with a width of the joined substantially parallel face sections. Advantageously the same system comprising a substantially straight wall may also comprise other adjacent face sections that are arranged non-parallel to each so as to form a section of the wall which is not straight.

Advantageously the system of retention devices may be arranged with adjacent face sections arranged to form an enclosure suitable for use as a holding tanking.

It is envisaged that the system may be available in numerous sizes depending upon volume of water to be held back. Ideally all parts may be scaled up or down so as to accommodate situations and/or locations where the system may be used.

DETAILED DESCRIPTION OF FIGURES

Figure 1:
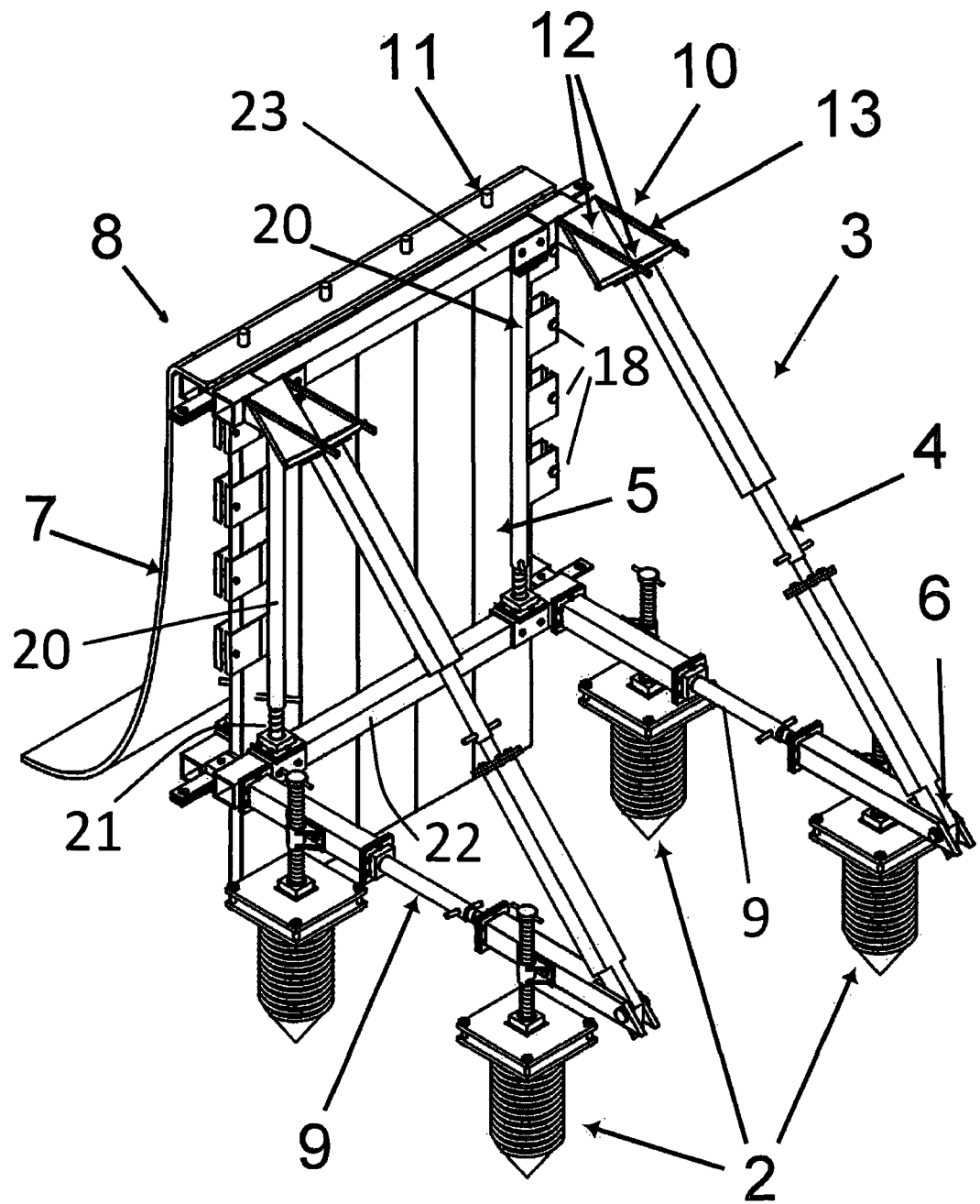
FIG. 1 shows an isometric view of a preferred embodiment of the device from rear.
Figure 2:
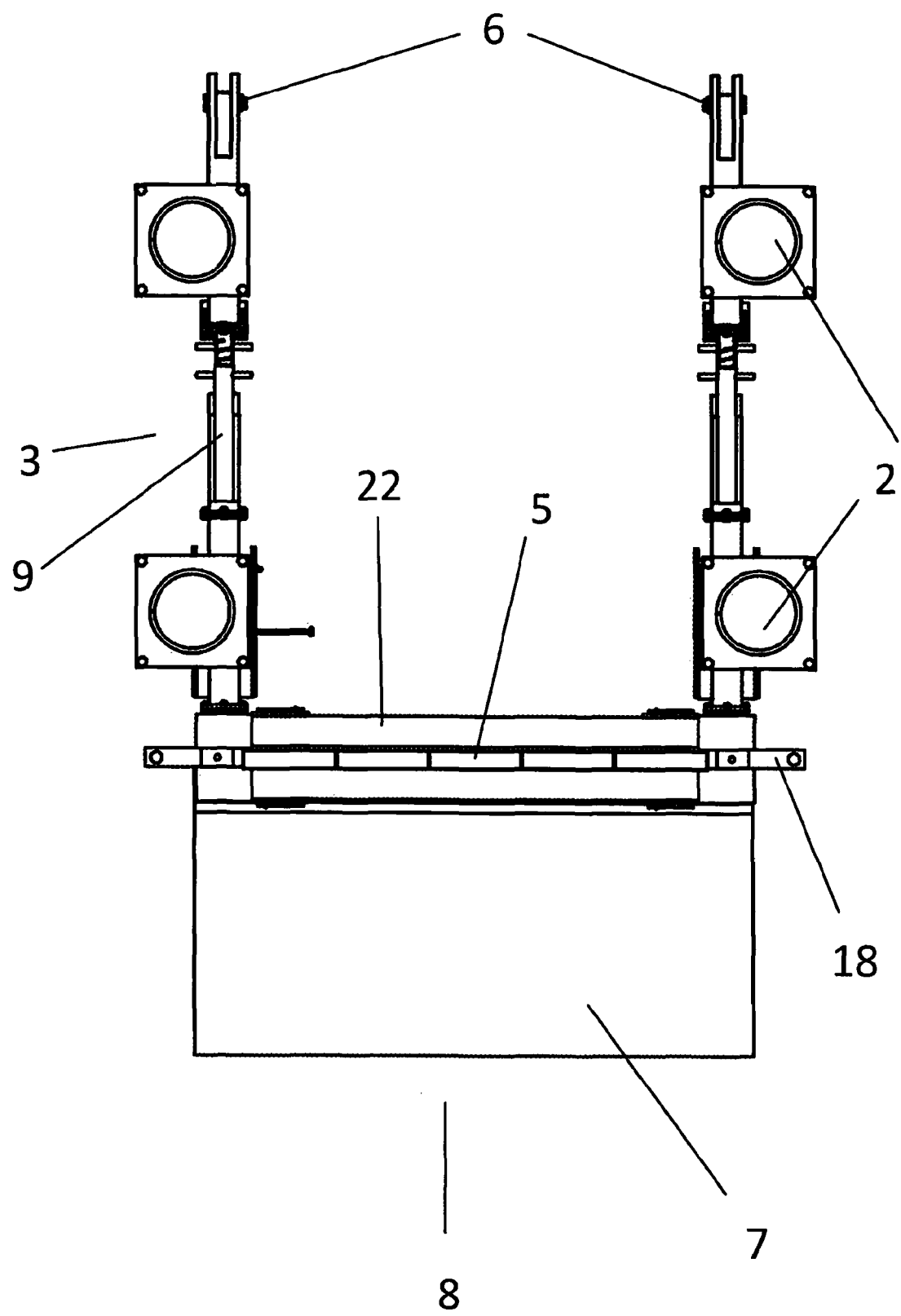
FIG. 2 shows a view from beneath of the embodiment shown in FIG. 1.
Figure 3:
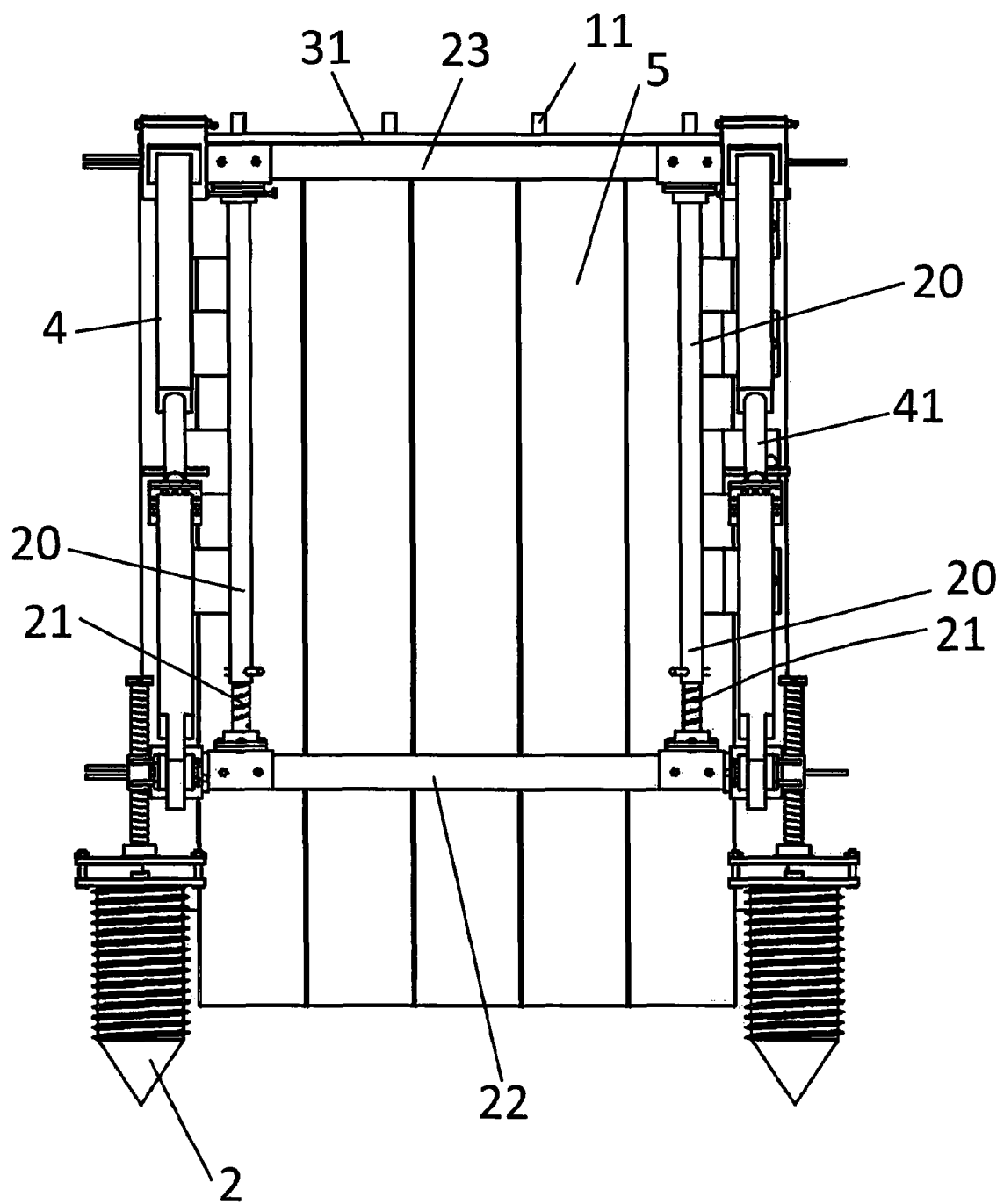
FIG. 3 shows a view from behind of the embodiment shown in FIG. 1.
Figure 4:
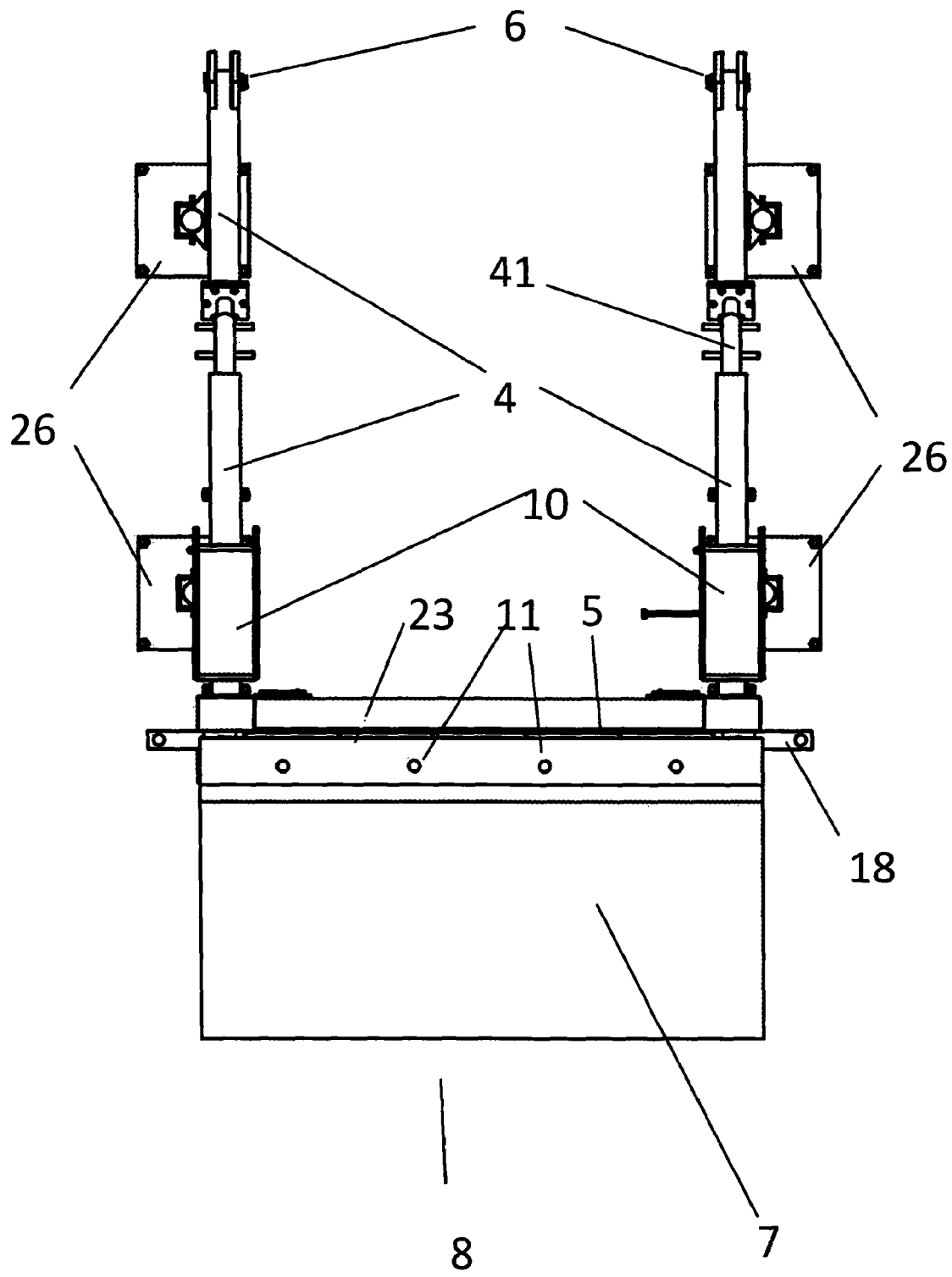
FIG. 4 shows a view from above of the embodiment shown in FIG. 1.

The pictured embodiment as shown in FIGS. 1 to 22 has a retention device comprising: a braced frame comprising a base section 9 and upstanding supports 20, 40. The frame is mountable on foundations 2 in a plurality of locations. The height of the frame is arranged to be adjusted by height-adjusting means. The device further comprises a face 8 supported by said frame. Preferably the face 8 is covered by a detachable mat 7.

The upstanding supports 20, 40 of the frame provide channels arranged to receive barrier 5. The mat 7 provides apertures dimensioned to receive and engage fastener studs 11. The mat 7 is fastened to the face 8 by fastener studs 11 which pass through apertures in the mat 7.

The face 8 is braced by a brace 3. The brace comprises an adjustable angled portion 4. The length of the adjustable angled portion is adjustable. The brace 3 also comprises an adjustable strut 9 that supports the adjustable angled portion. The length of adjustable strut 9 can also be adjusted.

In the pictured embodiment the adjustable angled portion 4 ends at a face plate 12. The face plate 12 combines with a link 13, low stress hinge 70, and angle plate 80 to form a stress-bearing section 10. The stress bearing section is in direct communication with the face 8. In other embodiments a second strut may be intermediate between the face 8 and angled portion 4.

The angled portion 4 interfaces with the strut 9 at a hinge 6.

The length of the adjustable angled portion 4 is adjustable to accommodate the adjusted height of the face section 8

The adjustable angle portion is connected between the face section and the base by hinges, and the adjustable angled portion rotates on these hinges as the height of the face section is adjusted. The adjustable angled portion is suitable for bracing or propping the face section against liquids and loose stuffs.

Figure 9:
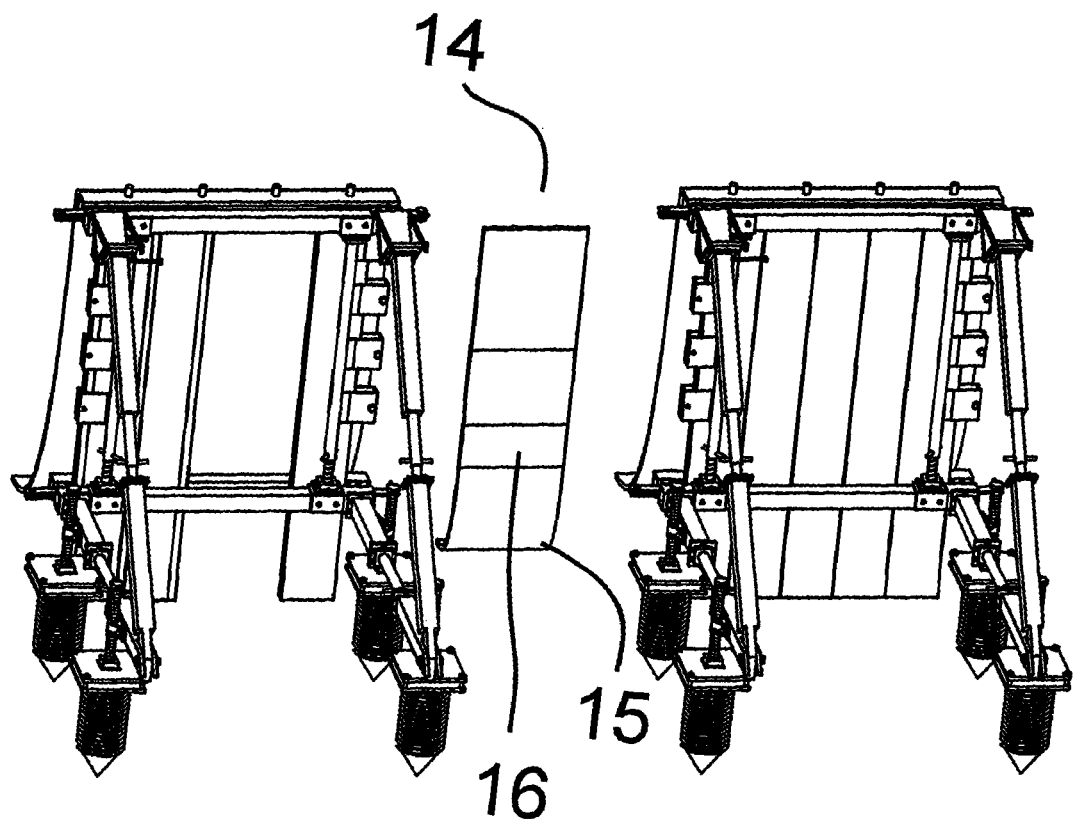
FIG. 9 show rear views of a system of more than one of the frames as shown in FIG. 1.

With reference to FIG. 9 the cover 14 includes a flexible bottom portion 15 and intermediate extenders 16 and is formed in rubber or flexible plastics.

Figure 10:
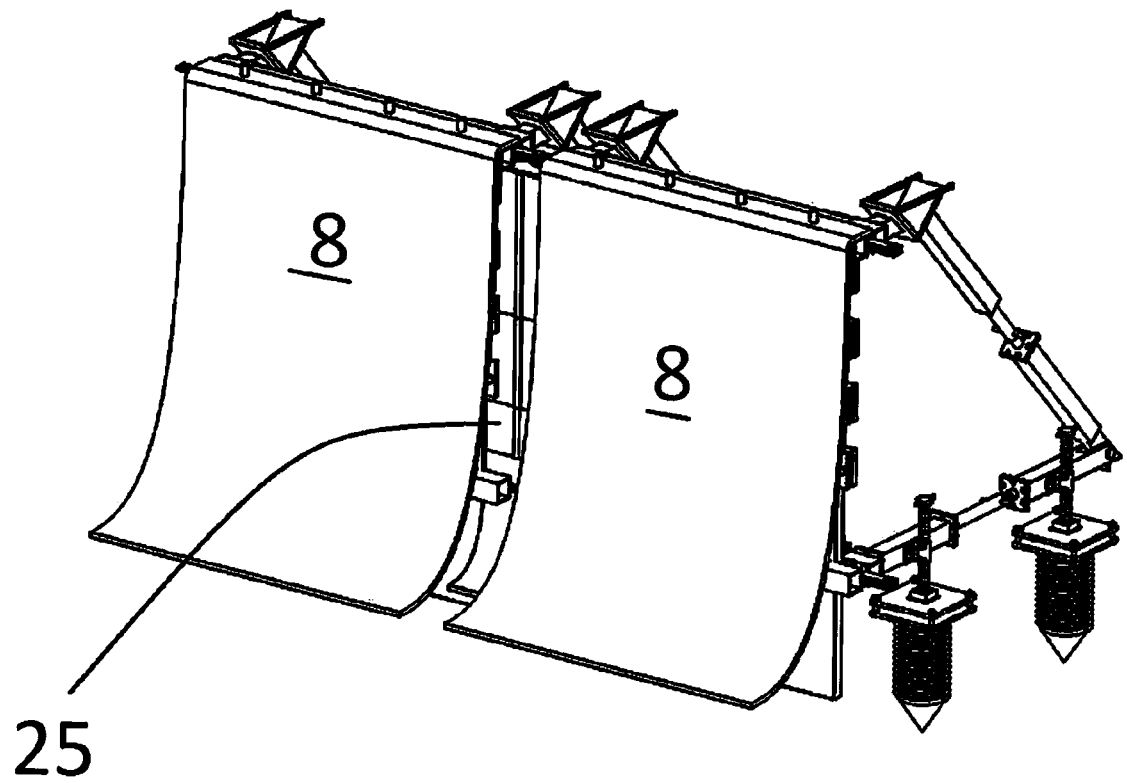
FIG. 10 shows a front view of a retention system comprising two retention devices with the lateral sides of their face sections joined by an expansion joint.

With reference to FIGS. 9 and 10, the cover 14 sits in the channels 50 for the barriers 5. The cover 14 also sits in the gap 25 between the face sections 8 of adjacent retention devices. Said channel 50 includes a plurality of grips to hold both the barrier 5 and cover 14.

Figure 12:
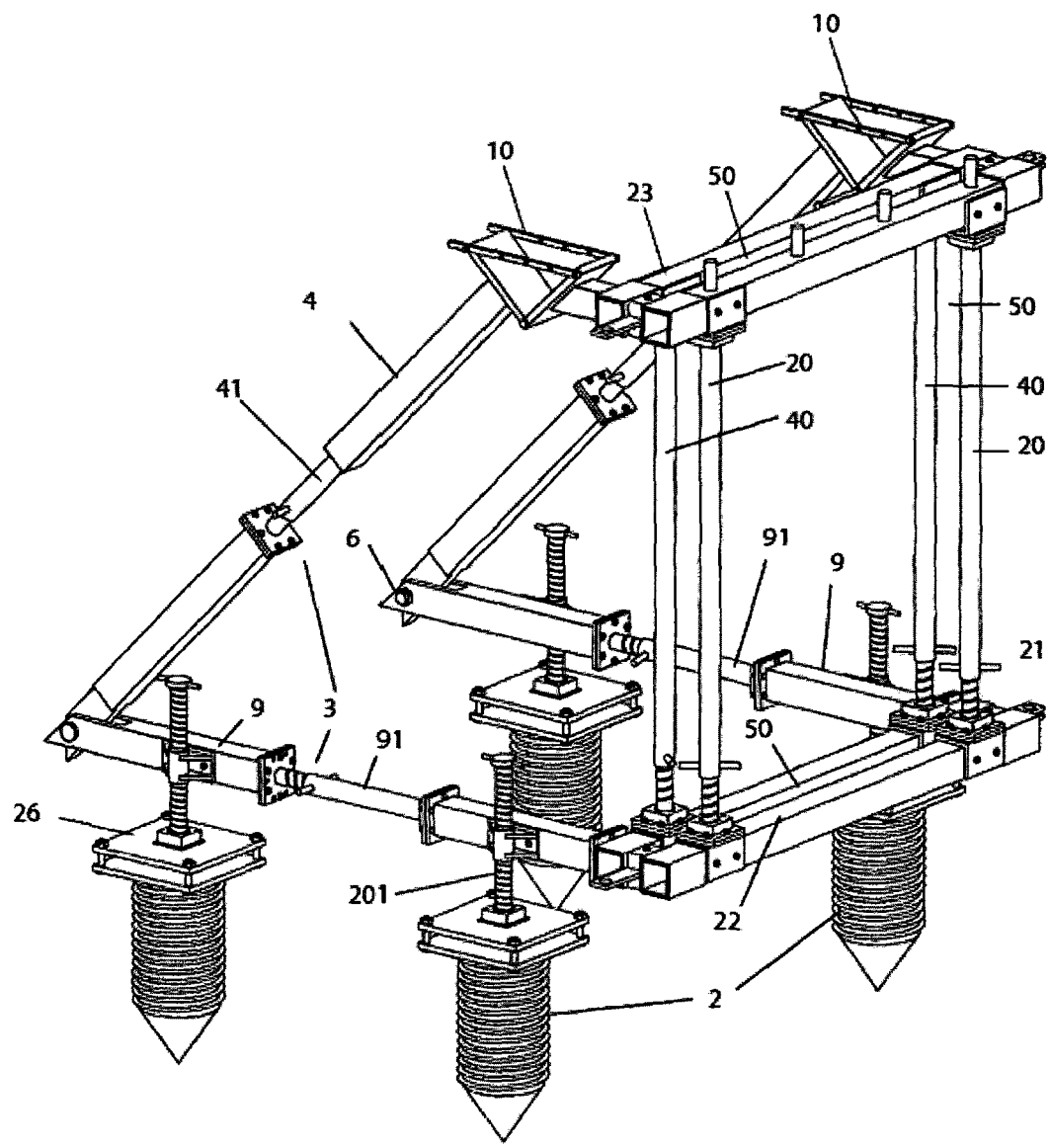
FIG. 12 shows an isometric view of the retention device with the barrier removed from the face section.
Figure 14:
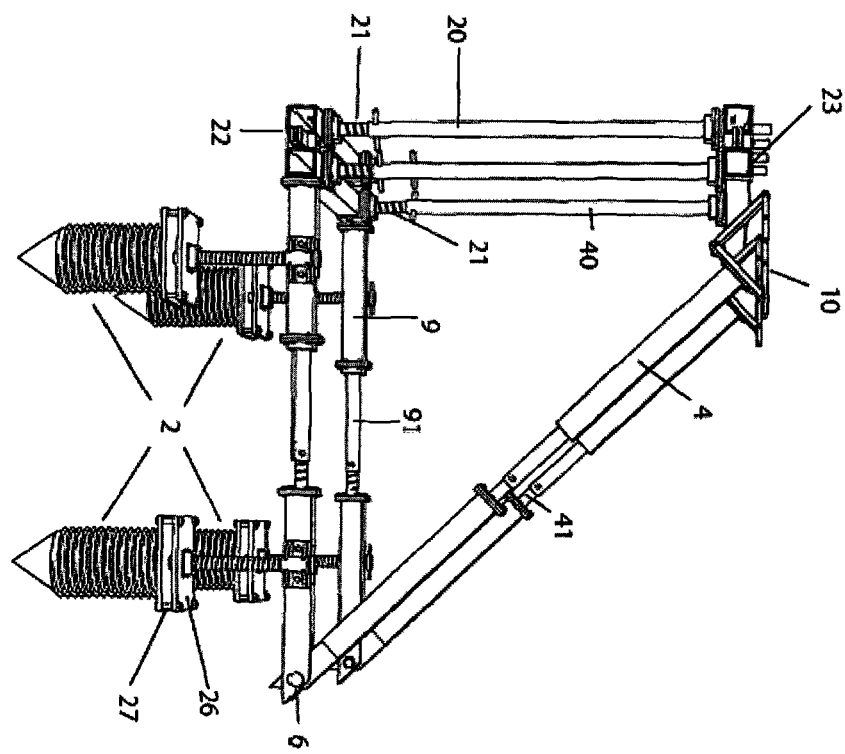
FIG. 14 shows on the left side a view of the retention device with the frame lowered and on the right side of FIG. 14 a view of the device with the frame raised.
Figure 14:
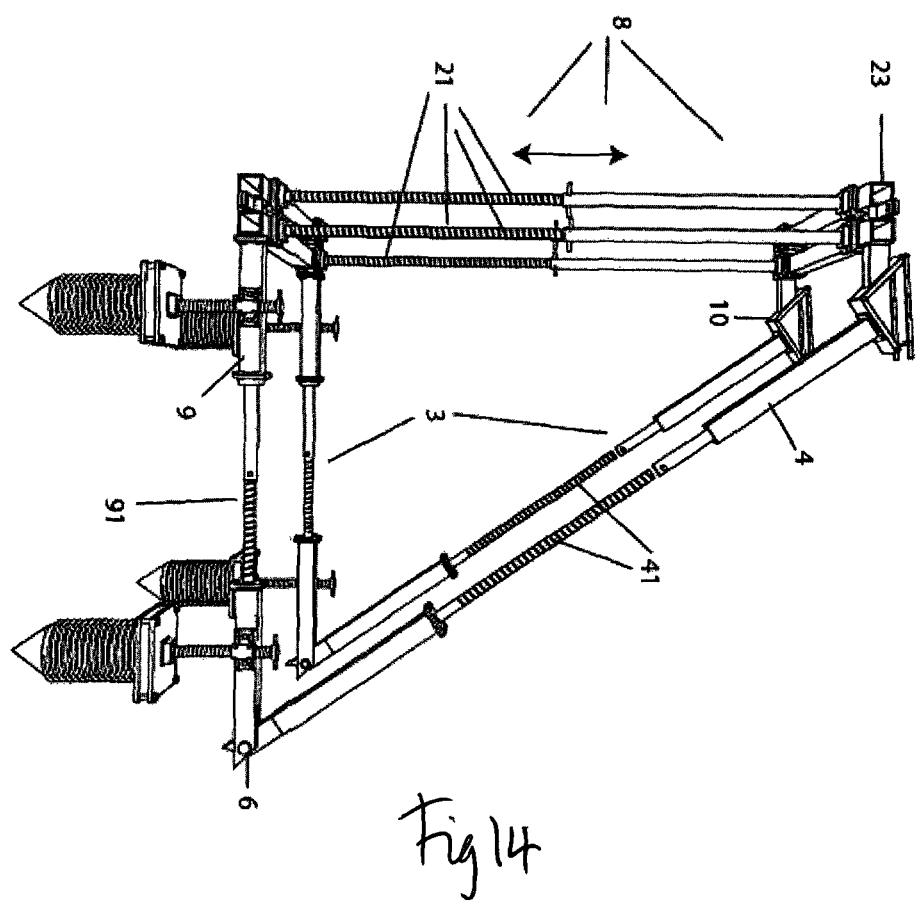
Figure 15:
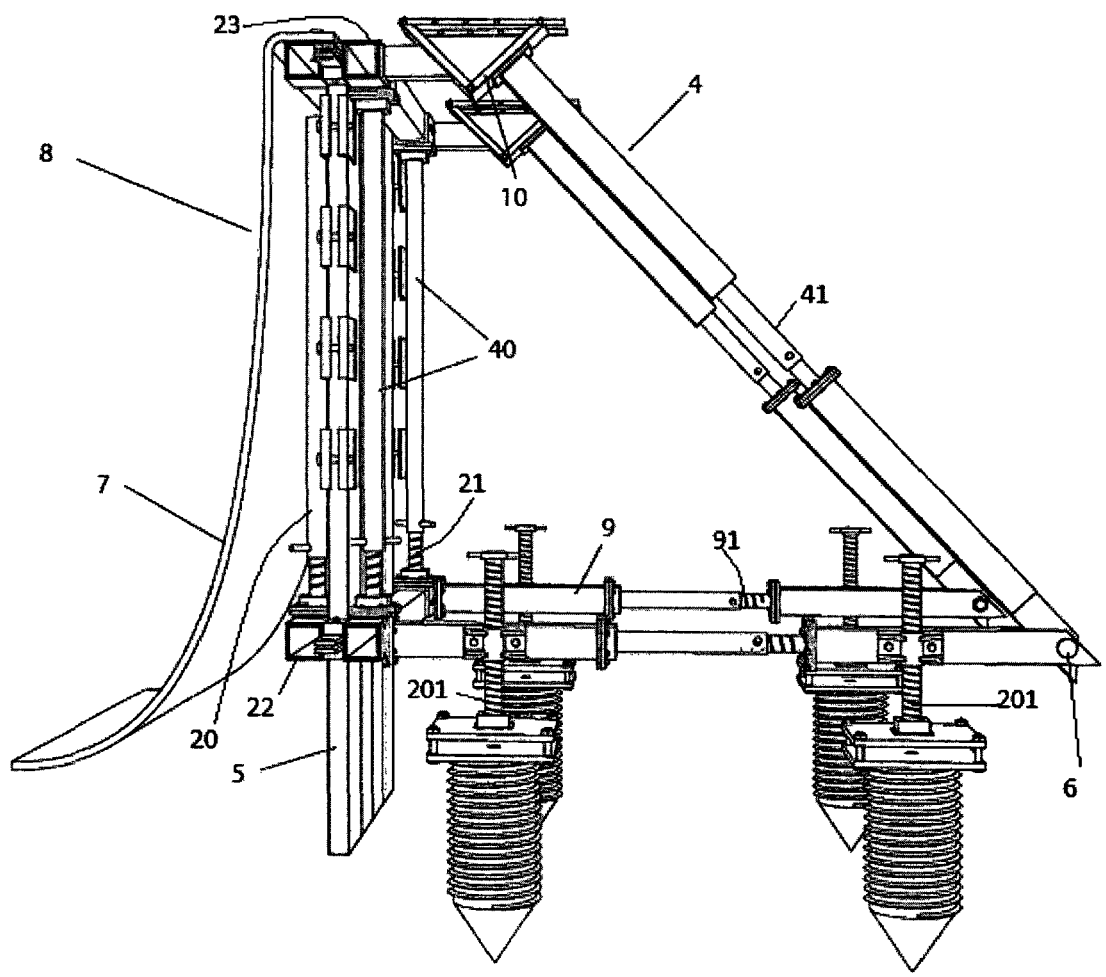
FIG. 15 shows a side three dimensional view of the retention device also shown in side view in FIG. 5.

The frame is skeletal. It is formed of elongate members and comprises the brace 3 and the face section 8. The brace 3 comprises the adjustable angled portion 4 and the base 9. The face section 8 comprises a bottom horizontal bar 22, top horizontal bar 23, and upstanding supports 20. The face section also comprises barrier 5 which lies in the plane of the face section 5. Preferably the face section 8 also comprises a mat 7, but the mat is not a necessary component of retention device. FIGS. 12 and 14 particularly show the frame.

Figure 5:
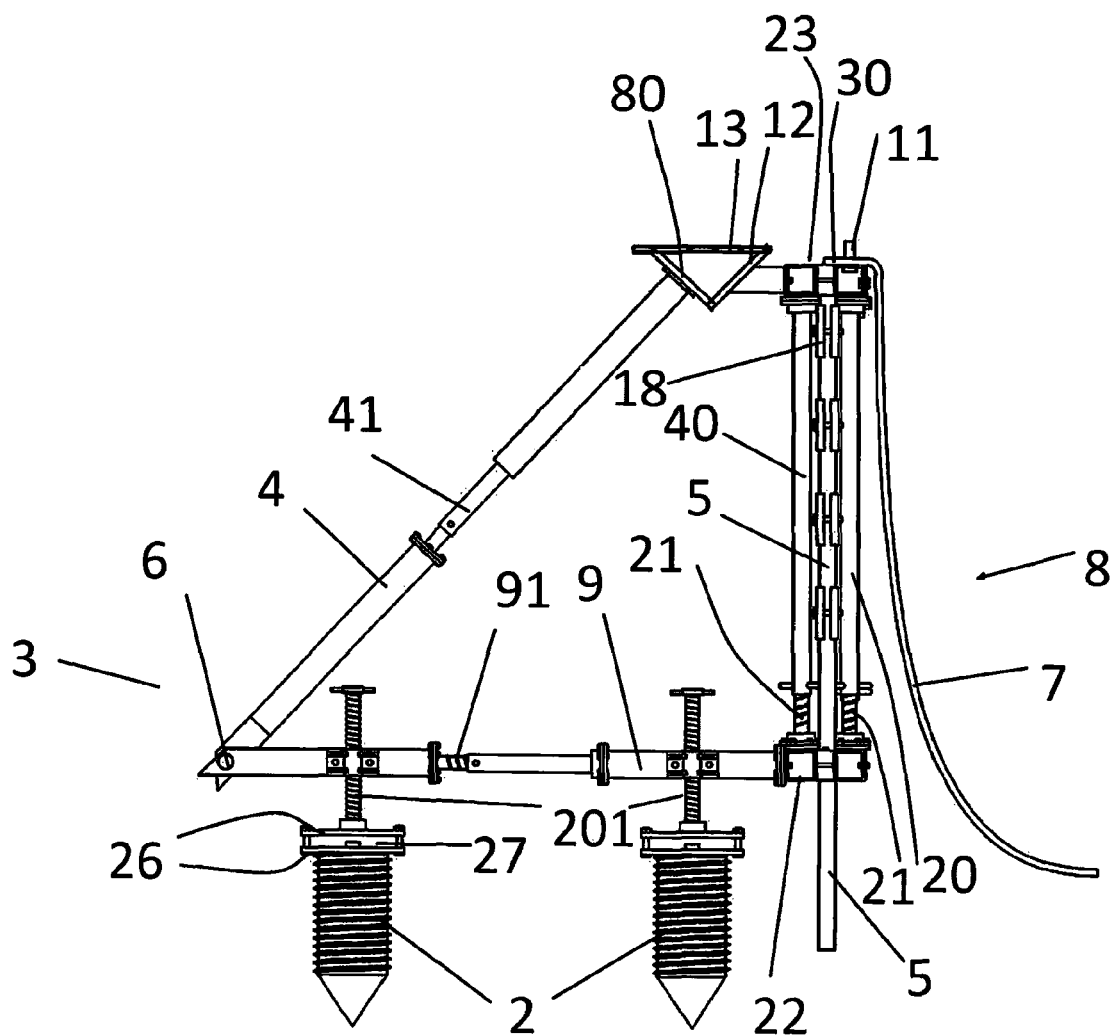
FIG. 5 shows a view from a side of the embodiment shown in FIG. 1.
Figure 6:
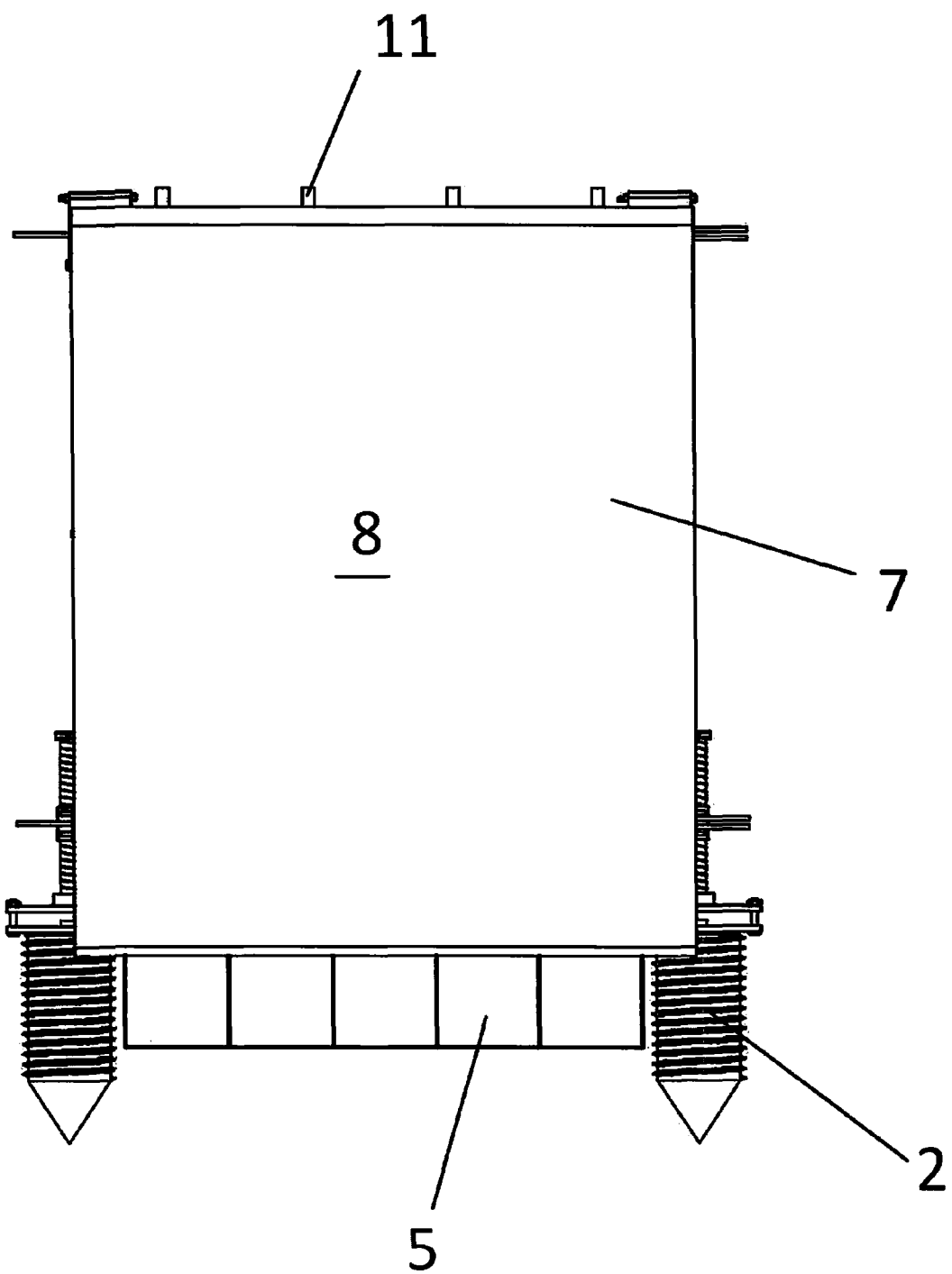
FIG. 6 shows a view from in front of the embodiment shown in FIG. 1.
Figure 7:
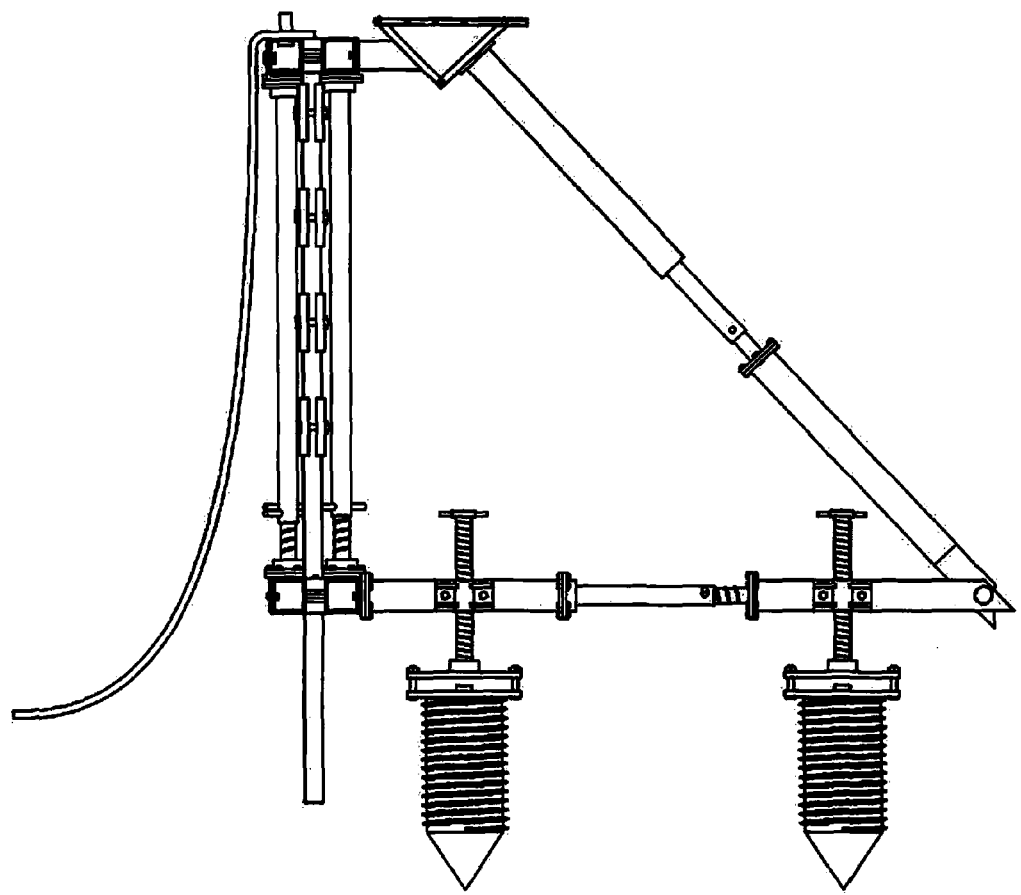
FIG. 7 shows a second side view of the embodiment shown in FIG. 1.
Figure 8:
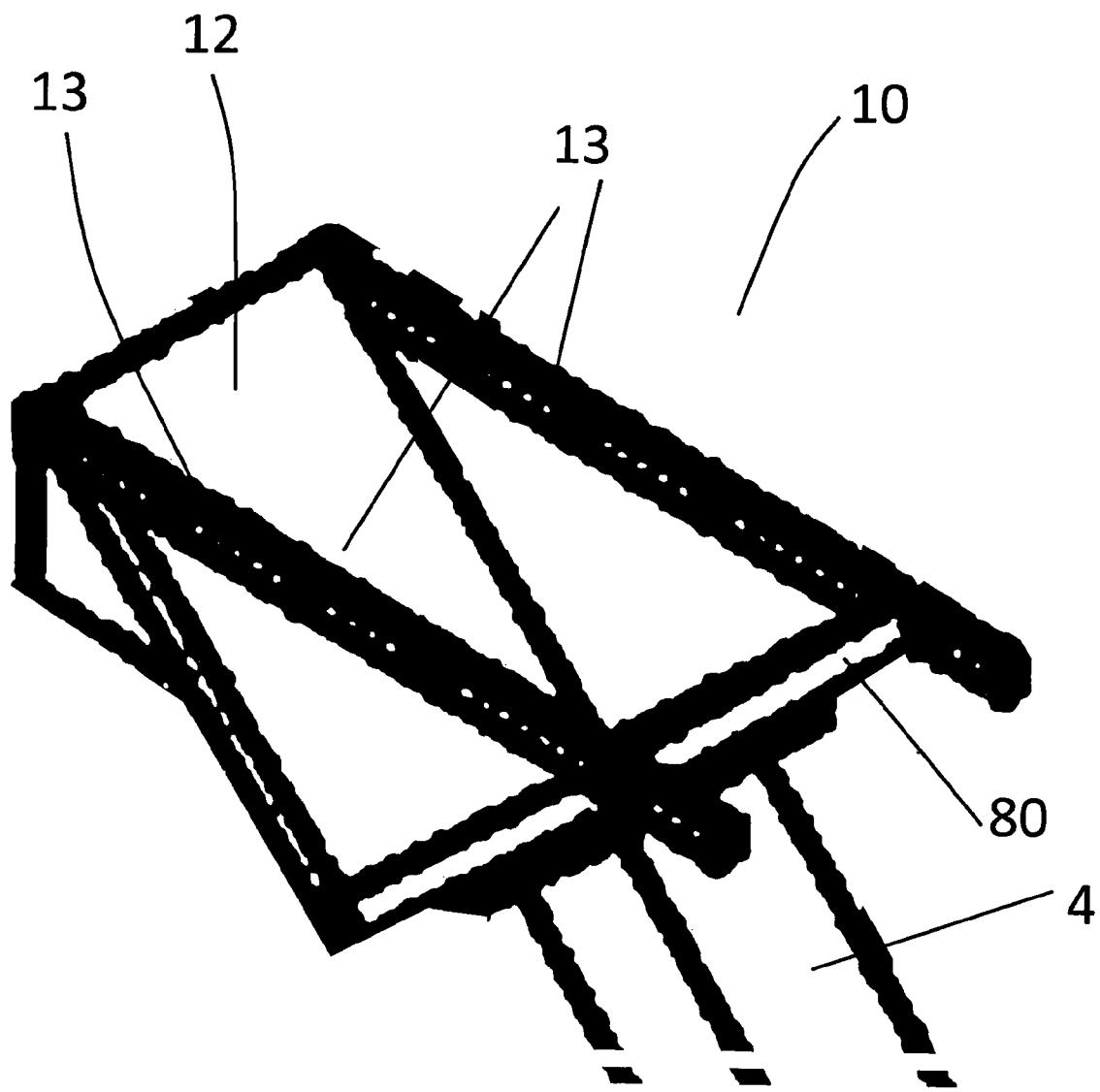
FIG. 8 shows a detail view of a preferred embodiment of a stress-bearing section.

The frame comprises a base section comprised of elongate adjustable struts 9 that form base. The adjustable struts in use lie substantially parallel to the ground. The adjustable struts are supported on foundations 2 which are anchored in the ground. The length of the base comprised by adjustable struts 9 is adjustable. The length is adjustable by means of a screw jack 91 or other length telescoping device as shown in FIG. 5.

The ground that the retention device is placed on may be rough, uneven, and rocky. Therefore the foundation anchors 2 are convenient as they can be screwed into the ground at locations that avoid rocky outcroppings and so forth. The length of the base may be adjusted to connect to the foundation anchors where they are located in the ground.

An elevation adjustment means attached to the frame and to the foundation anchors 2 enables the elevation of the frame above each anchor to be adjusted. FIG. 12 shows the elevation adjustment means as a screw jack 201.

There is an adjustment jack 201 located at each connection between the base 9 and foundation 2. Therefore the slope of the base can be adjusted relative to the ground in which the foundation is anchored.

As the face section 8 is substantially perpendicular to the base, adjusting the slope of the base 9 also adjusts the orientation of the face section relative to the foundation in ground.

In the field the ground tends to undulate. The capability of the base to be oriented with respect to the foundation in the ground is useful because the height the ground tends to vary in the actual environment where the retention device is used.

In use two or more retention devices are placed lateral side by lateral side and fixed to the adjacent foundation anchors. Then the orientation of bases 9 of adjacent retention devices are adjusted by screw jacks 201 at each foundation connection point.

The bases 9 of adjacent retention devices are adjusted to be substantially parallel. This has the effect of adjusting the adjacent face sections 8 so that they are substantially parallel as the orientation of the face section 8 is adjusted when the orientation of the base 9 is adjusted. This is because each face section 8 is always nearly perpendicular to its base.

An expansion joint for connecting two retention devices into a system can be seen in FIG. 10 between the two adjacent face sections 8. The expansion joint is also shown in detail in FIG. 18 and FIG. 19.

As the face sections 8 of retention devices are adjusted to be substantially parallel the lateral sides of the adjacent face sections 8 are aligned for connection by an expansion joint. That is because the elevation of the bases 9 of the adjacent retention devices and their face sections 8 are adjusted by screw jacks 201 to be substantially parallel, and thereby the lateral sides of adjacent retention devices may be joined by the expansion joint.

The retention device comprises augur type foundation anchors 2 as shown in FIGS. 1, 2, 3, 5, 6, 12, 14, 16 and 20. In use these augur type foundation anchors 2 fix the base 9 of the retention device securely to the ground. A concrete foundation is not needed. The augur anchors are screwed piles and provide the foundation in use.

There is further means of propping the barrier 5 against the pressure of liquid or other free flowing material against the face section 8. Soil, aggregate rocks, sand backs, and so forth conveniently backfill against the barrier 5.

The frame comprises a face section 8. The bottom side of the face section comprises a bottom horizontal bar 22 connected to the adjustable struts of the base 9. The bottom horizontal bar is also aligned substantially parallel with the ground in use because the base is connected to the foundation 2. The top side of the face section comprises a top horizontal bar 23 aligned substantially parallel to the bottom horizontal bar 22. The lateral sides of the face section 8 are the upstanding supports 20, 40. One end of each upstanding support is connected to the bottom horizontal bar 22. The other end of each upstanding support is connected to the top horizontal bar 23. The perimeter formed by the rectangular arrangement of the top horizontal bar 23, bottom horizontal bar 22, and the upstanding supports 20, 40 is the perimeter of the face section 8.

It is not necessary for the lateral sides of the face section 8 formed by the upstanding supports 20, 40 to be connected to the very edge of the top horizontal bar 23 or bottom horizontal bar 22. The edge of the top horizontal bar may overhang the lateral sides.

The top horizontal bar 23 comprises a slot through which channel 50 passes. The bottom horizontal bar also comprises a slot through which channel 50 passes. This same channel 50 is bounded by upstanding supports 20, 40.

The face section 8 comprises barrier 5 to free flowing substances. Free flowing substances are by example water, other liquids, mud, sand, rocks. Free flowing substances are not limited to the preceding examples because free flowing substances are any loose stuffs which move if not retained.

The barrier 5 in the channel 50 is visible in FIGS. 2, 3, 4, 5, 15, and 21.

Figure 21:
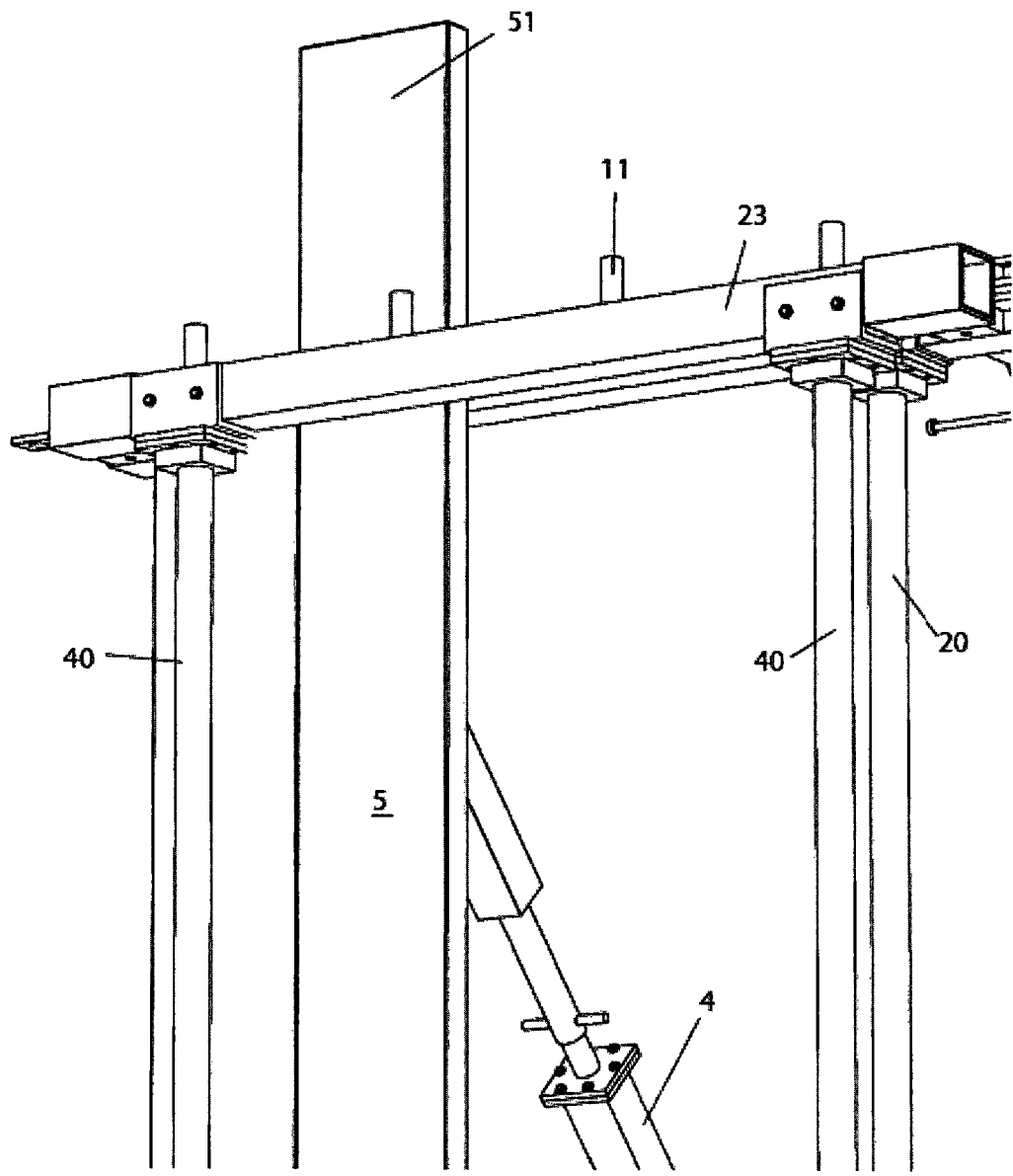
FIG. 21 shows a barrier partially raised.

The barrier 5 is formed by slats 51 which are insertable into the channel 50 as shown in FIG. 21. The slats are placed edge to edge, possibly with spaces between the edges, and thereby the barrier 5 blocks off the face section.

The slats 51 forming barrier 5 pass through the slot forming the channel 50 in the bottom top horizontal bar 22 shown in FIG. 12 and FIG. 21. The slats 51 forming barrier 5 pass through the slot forming the channel 50 in the bottom horizontal bar 22 shown in FIG. 12.

The barrier is waterproof or partially waterproof depending if the edge to edge contact of the slats is arranged to form a waterproof seal.

Figure 16:
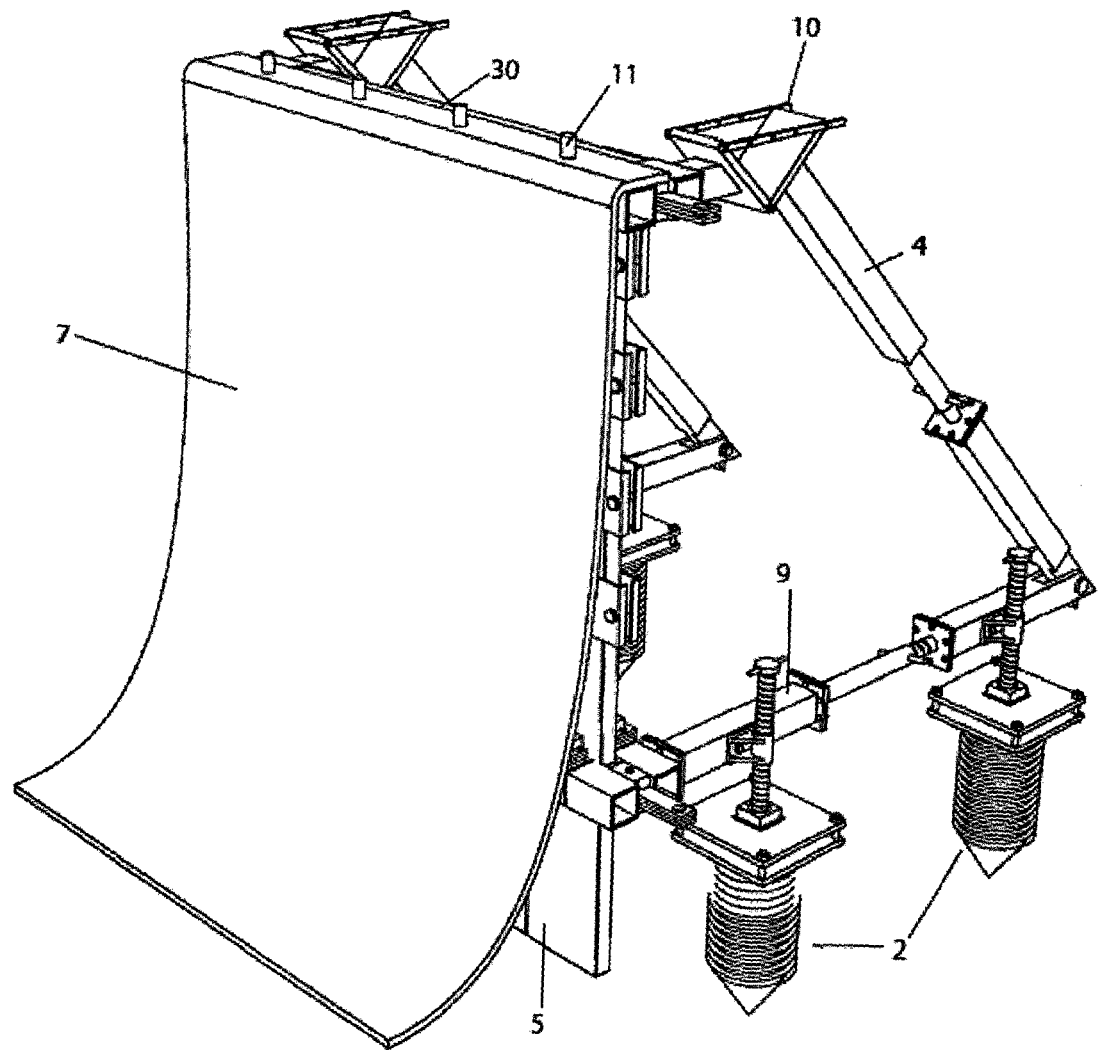
FIG. 16 shows a front side isometric view of the retention system.
Figure 17:
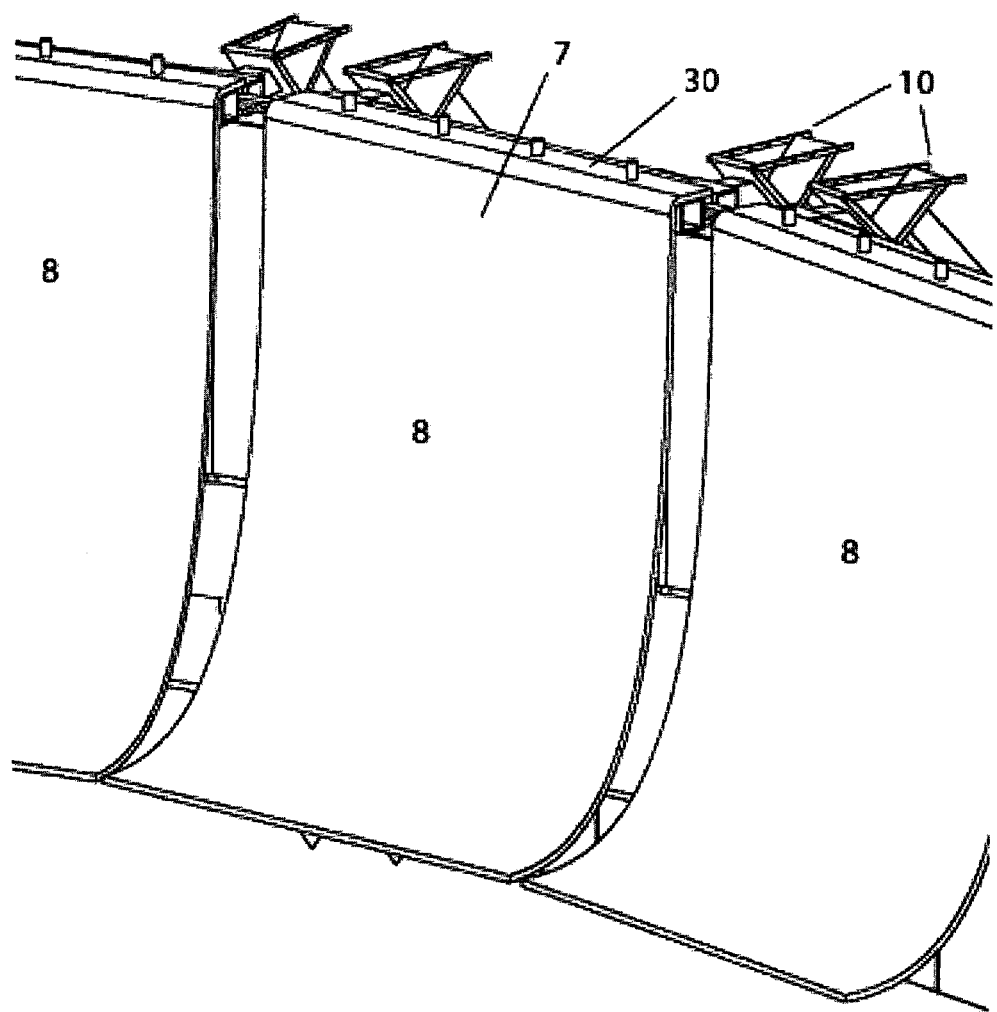
FIG. 17 shows a plurality of the retention devices joined side by side as a river bank barrier.

Near the top of the face section 8, such as near or at the top horizontal bar 23, the face section 8 comprises a suspension means from which to hang a mat 7 so that the mat 7 hangs down as a curtain from the suspension means in front of the face section. FIGS. 1, 16, and 17 show the mat 7 hanging as a curtain at the front of the face section. A waterproof mat 7 makes the face section 8 more impervious to water. A tough and durable mat 7 makes the face section 8 a more effective and longer lasting wall against loose stuffs.

The horizontal top bar suspension means for the mat 7 are fastener studs 11. The studs 11 poke up from the top bar 23. There are apertures arranged along the top edge of the mat. These fastener studs 11 poke through the apertures to hold the mat 7.

The length of the frame is adjustable in the direction perpendicular to the base 9 because the frame is perpendicular to the base. Thus the height of the face section 8 is adjustable in the direction perpendicular to the base 9 because the face section 8 is substantially perpendicular to the base 9. The base is fixed to the foundation anchors 2. In use the foundation anchor 2 augers into the ground. Thus in use the base 9 is substantially parallel to the ground. Although the elevation and orientation of the base 9 is adjustable by jacks 201 located at each connection of the base 9 to foundation anchors 2.

Because in use the base 9 is substantially parallel to the ground and the frame and face section 8 are substantially perpendicular to the base 9, the frame and face section 8 are substantially vertical with respect to the ground.

This can be seen by comparing the height of the face section of the retention device in the left side of FIG. 14 to the height of the face section in the right side of FIG. 14. The height of the raised face section in FIG. 14 is higher because the top horizontal bar 23 is higher and because the length of the upstanding supports 20, 40 are longer.

To accomplish raising or lowering the face section 8, the upstanding supports are lengthened to raise the top horizontal bar 23 and shortened to lower the top horizontal bar. Telescopic action of the screw jacks 21 accomplishes the lengthening and shortening of the upstanding supports 20, 40.

The face section remains substantially perpendicular to the ground as it is raised or lowered. The foundation anchors 2 are fixed immovable in the ground as the face section is raised or lowered.

So that the face section is maintained substantially vertical as the height of the face section is increased or decreased, the length of the adjustable angled portion 4 is adjustable an able to rotate about the hinge 6 that attaches the adjustable angled portion 4 to the base. The length of the adjustable angled portion 4 is adjustable with a telescopic mechanism or other length adjusting mechanism such as screw jack 41.

The angled portion 4 connects the face section 8 to the base 9. The screw jack 41 is comprised within the angled portion 4.

The upstanding supports 20, 40, the adjustable angled portions 4, and base adjustable struts 9 all comprise a length adjusting means such as a screw jack. An advantage of this type of a length adjusting means is that as the length is adjusted the support, portion, and strut are able to support the load of the frame weight and liquid pressure along their axis.

Thus the height of the frame is adjustable, and especially the height of the face section 8 is adjustable, because the height of the top horizontal bar above the ground is adjustable. Raising and lower the height of the top bar is accomplished by lengthening and shortening the upstanding supports. The upstanding supports 20, 40 comprise a telescope mechanism to adjust their length. This is illustrated by the screw jacks 21 visible in for example FIGS. 1 and 14 at the bottom of the upstanding supports 20, 40.

The face section 8 is braced by a length adjustable angle portion 4 in the form of an elongate telescoping bar visible for example in FIGS. 1, 13, 14, 15, and 16. One end of each telescoping bar 4 is connected the face section 8 near the top horizontal bar 23. The telescoping bar is angled down and away from the face section 8. Preferably the mat 7 hangs down the front side the face section 8 and the telescoping bar 4 extends away from the opposite side of the face section.

The adjustable angled portion 4 comprises a screw jack 41 for adjusting the length of the adjustable angled portion.

Figure 11:
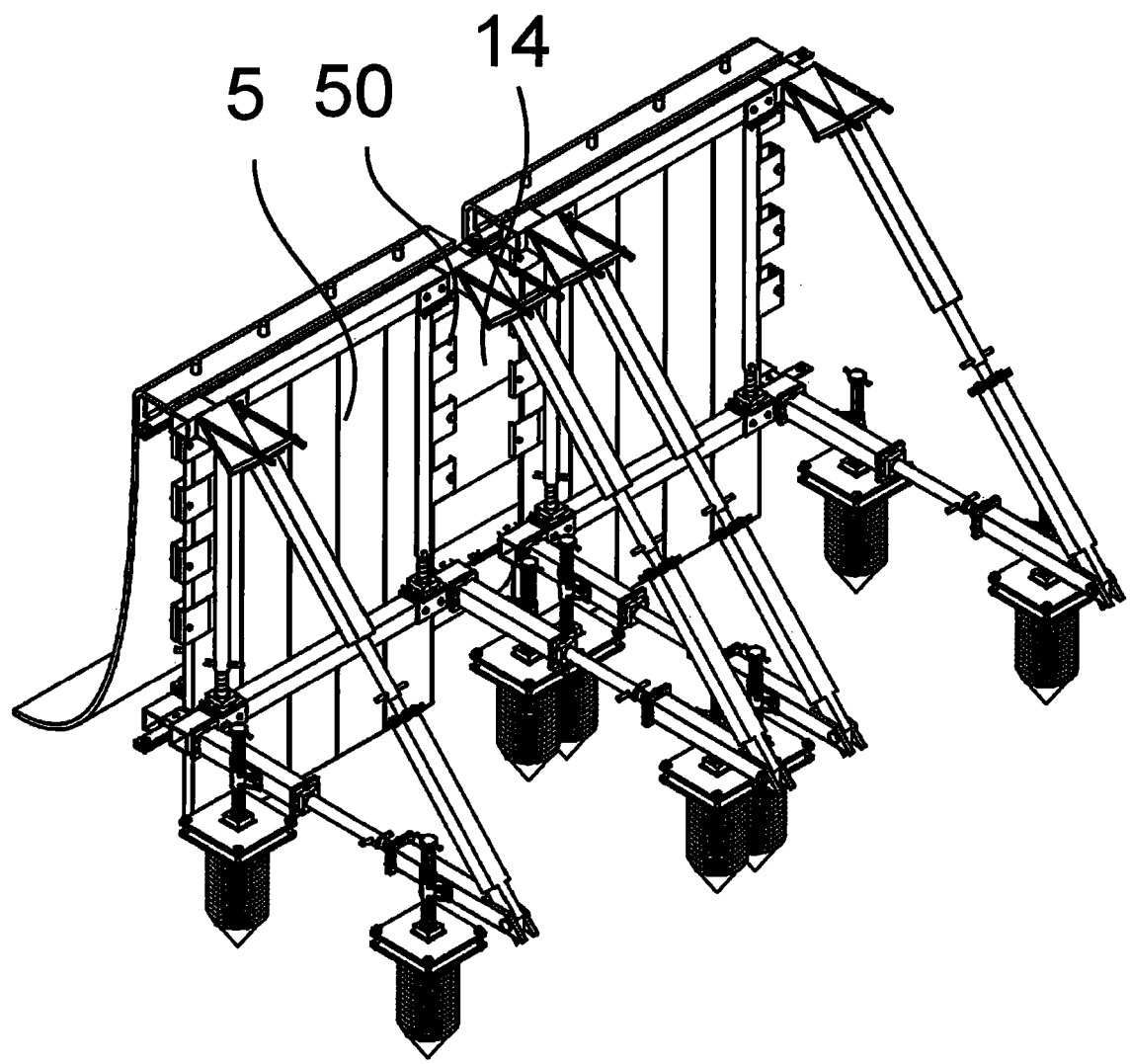
FIG. 11 shows a rear view of the retention system comprising two retention devices with the lateral sides of their face sections joined by an expansion joint as in FIG. 9.

Each length adjustable angle portion 4 has an opposite end that is not connected to the face section. The opposite end is connected to the base 9. The base 9 as shown in FIGS. 1 and 11 comprises two elongate length adjustable struts which in use are substantially parallel to the ground. In use these base bars 9 are fixed to foundation anchors 2 which are anchored in the ground.

As shown in side views FIG. 5, FIG. 7, FIG. 14, and FIG. 15, the upstanding supports 20, 40 of the face section 8, the elongate telescoping length adjustable angle portion 4, and the base adjustable strut 9 form a shape that is triangular or nearly triangular. The face section 8 is one side of the triangle, the elongate telescoping length adjustable angle portion 4 is the second side, and base adjustable strut 9 is the third side.

A hinge 6 connects the elongate telescoping length adjustable angle portion 4 to the base adjustable strut 9.

To adjust the height of the face section 8, the top horizontal bar 23 is raised or lowered so that the upper portion of the face section is raised and lowered. The elongate telescoping length adjustable angle portion 4 must extend as the upper portion of the face section is raised and lowered. This is accomplished by the telescopic action of the elongate angle portion 4 and the hinge 6. A means of telescoping the elongate angle portion 4 is a screw jack 41 comprised within it.

To facilitate vertical motion of the upper portion of the face section 8 there is a specially designed stress bearing section 10 that connects the elongate angle portion 4 to the upper portion of the face section 8.

Figure 13:
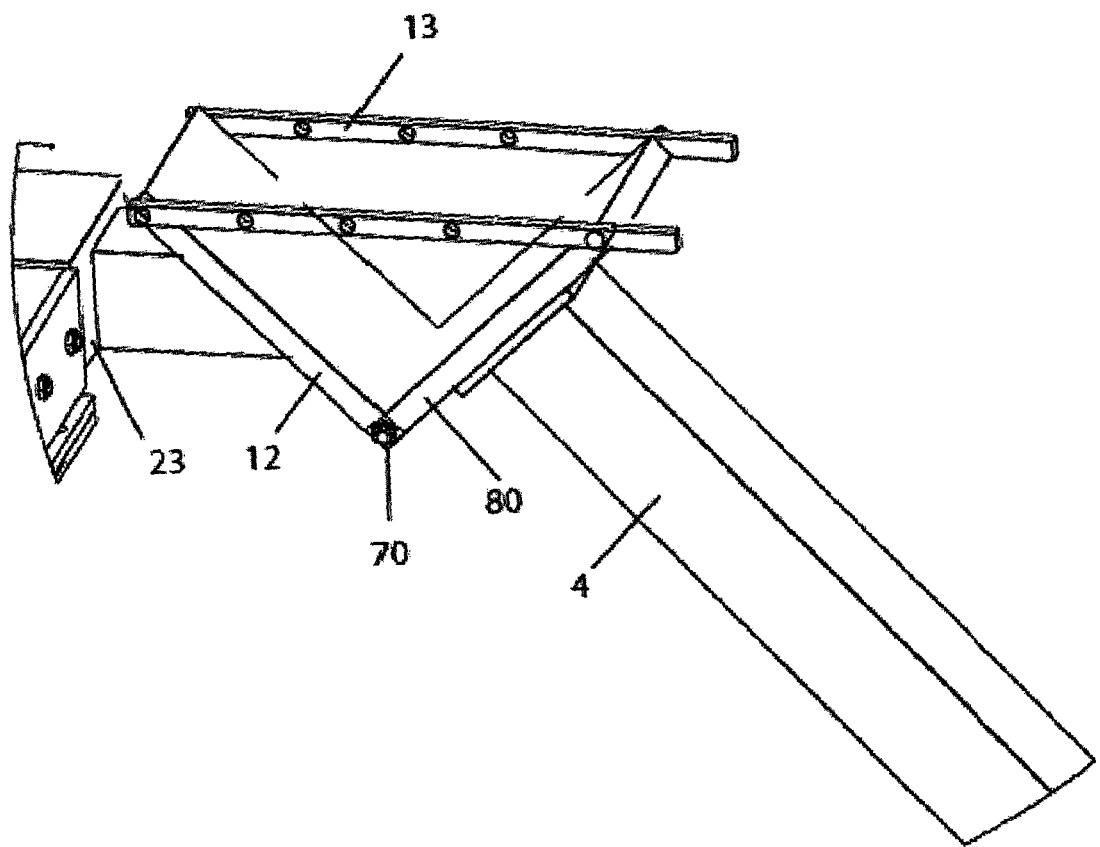
FIG. 13 shows further detail of the stress bearing section as shown in FIG. 8.

The stress bearing section 10 can be seen in side view in isometric view in FIG. 12 and a close up in FIG. 13. The stress bearing section 10 comprises a low-stress hinge 70. The stress bearing section also comprises two plates. One is a face plate 12 that bears against the face section 8. The other is an angle plate 80 that bears against an end of the elongate adjustable angled portion 4.

An advantage of the stress bearing section is that that low-stress hinge 70 allows the upper portion of the face section 8 to move vertically while the elongate adjustable angled portion is free to rotate and telescope to accommodate the changing angle and length of the hypotenuse of the triangle as shown in FIGS. 13 and 14.

A second advantage of the stress bearing section is provided by a link 13 that spans the included angle between the face plate 12 and the angle plate 80. The link is a means to lock the included angle after the upper portion of the face section has been raised or lowered.

When water pressure presses the upper portion of the face section 8 against the elongate adjustable angled portion 3, much of the load is transmitted through the link 13 rather than the low-stress hinge 70. A conventional hinge would be over stressed by the water pressure. Advantageously the low stress hinge 70 is not over stressed.

The length of the mat 7 is adjustable in the vertical direction. As frame height is raised or lowered the length of the mat 7 adjusts itself accordingly.

In one embodiment to adjust the length of the mat, it is rolled up and down from the top horizontal bar 23. The top edge of mat 7 is attached to the long edge of the horizontal top bar 23 and in use the mat 7 is unrolled until the rolled portion reaches the ground.

Figure 22:
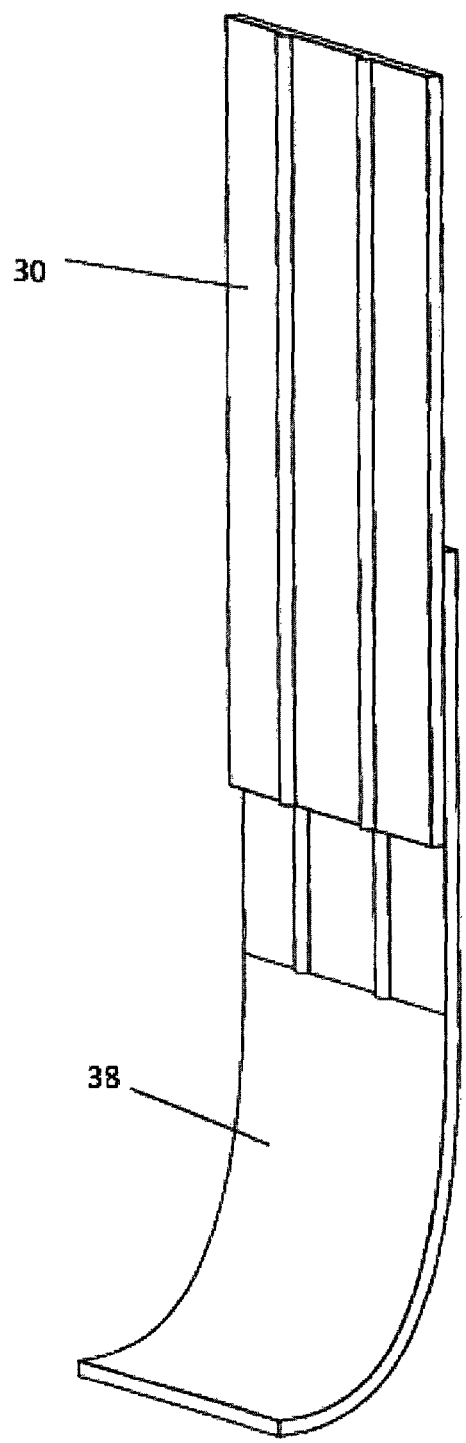
FIG. 22 shows a mat comprising a top portion and flexible bottom.

In another embodiment shown in FIG. 22 the mat 7 comprises a top portion 30 and a flexible bottom 38. The top portion 30 is a flexible sheet or a stiff plate. It has a lower edge that overlaps the upper edge of the flexible bottom. The top portion slides down while covering the upper part of the flexible bottom. The overlap provides between the top portion 30 and the flexible bottom 38 a water tight or nearly a water tight seal so that the water is prevented from leaking through the face section 8. The two part mat forms a curtain that is suspended from the long edge of the top of the face section 8.

To further extend the height of mat 7 it comprises intermediate extenders 39 between the top portion 30 and the flexible bottom 38. The intermediate extender is a flat plate or flexible sheet that is waterproof and overlaps with the top portion above it and the flexible bottom below it. The overlap forms a watertight or nearly water tight seal across the face section 8.

Joints that connect metal components together comprise two flanges 26 pressed face to face and a flexible and corrosion resistant pad 27 between the flange faces. So the joints are tough, not brittle, and don't rust or corrode. Preferably the flanges are made of metal strength. The pads are flexible polymer about ten millimeters to twenty millimeters thick. Such a joint comprising flanges 26 and pad 27 is shown in FIG. 5 between the base adjustable strut 9 and the foundation anchor 2. Another such flanged flexible joint forms part of the screw jack 41 of the elongate adjustable angled portion 4 and the screw jack 91 of adjustable strut 9 comprised within the base.

Suitable polymers for the pad are for example natural rubber and synthetic plastic and any other material that is flexible and corrosion resistant.

The adjustable angled portion 3 is an elongate bar and comprising an extension means 4.

Figure 18:
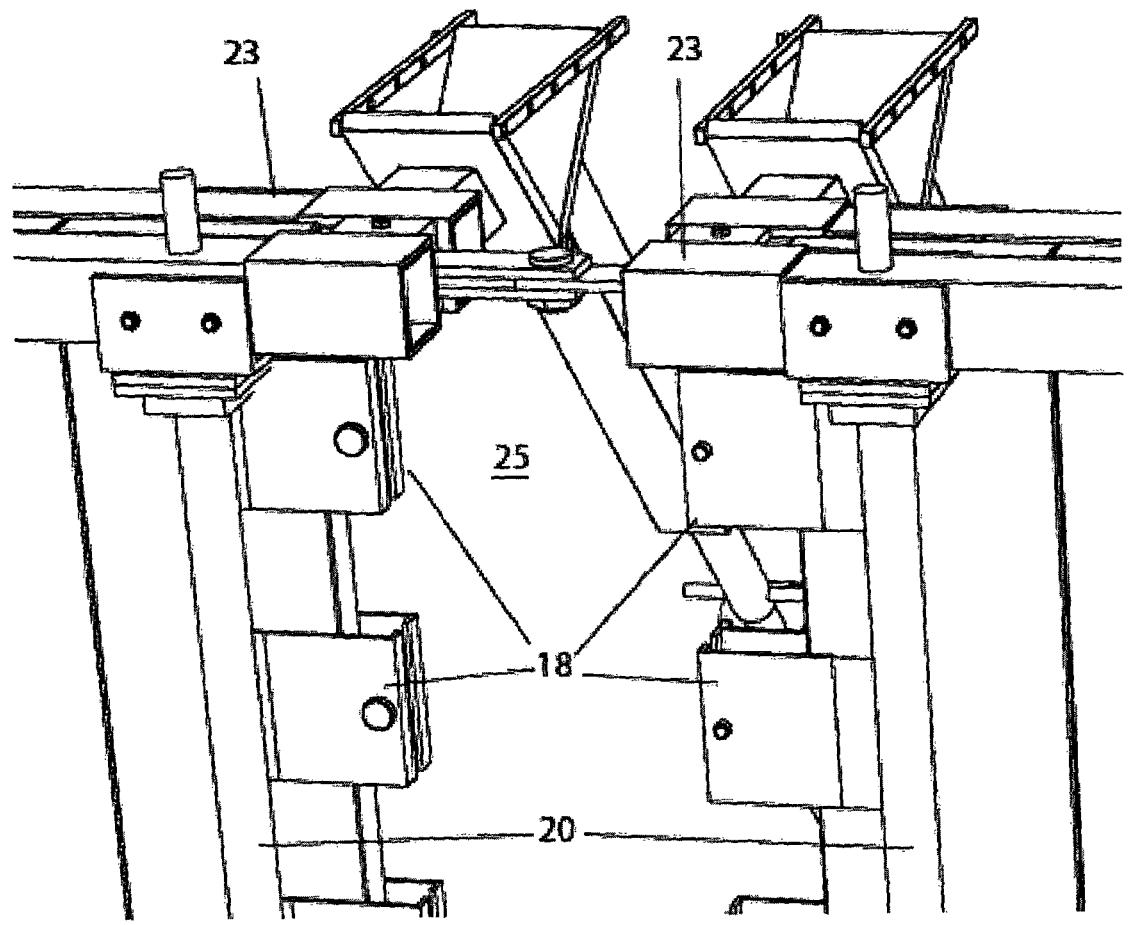
FIG. 18 shows a gap between grips of an expansion joint between two retention devices arranged side by side.
Figure 19:
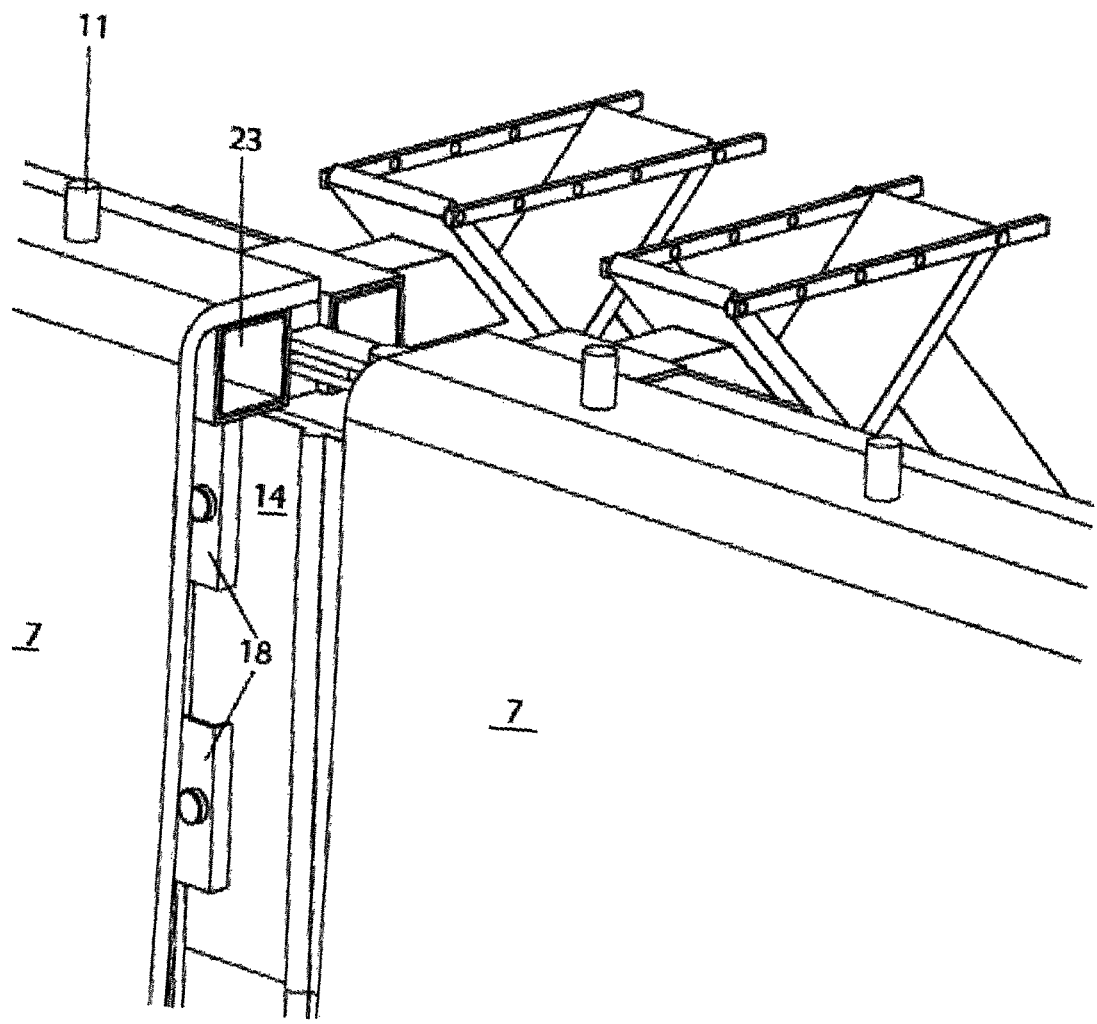
FIG. 19 shows the gap of FIG. 18 closed by mats and a cover.

An expansion joint connects lateral sides of face sections 8 when two retention devices are placed side by side to form a lengthened barrier. The expansion joint allows the distance between connected frames to expand and contract with temperature. An expansion joint is shown in FIG. 18 and FIG. 19.

FIG. 9, FIG. 10, FIG. 11, FIG. 17, and FIG. 20 show how a plurality of retention devices can be arranged to form a longer retaining wall or a holding tank. Each retention device has a face section 8 having lateral sides near the upstanding supports 20. A lateral side of a face section is joined to a lateral side of an adjacent face section thereby forming a longer retaining wall or holding tank.

The lateral sides of the face section 8 comprise a means to grasp an edge of a resilient and waterproof cover 14. These are illustrated by grips 18 extending laterally from the lateral sides of the face section. The grips 18 clamp the cover 14 between jaws. Preferably the cover 14 is a flexible sheet. The lateral sides of the face sections are close together, but they are not touching. There is a gap 25 between the lateral sides of adjacent frames.

The cover 14 spans the gap between the lateral sides of adjacent face sections and thereby covers the gap 25. As the cover is resilient, the gap is free to expand and contract with hot and cold weather. Preferably the cover is water proof, resilient, tough, and flexible.

Advantageously because the cover is flexible it bends to cover a gap 25 between adjacent face sections 8 that are not parallel. Thus as in FIG. 20 where the frames are arranged at right angles to form a holding tank 32 the gap between the lateral edges is covered by the flexible cover and prevents water from passing through the gap.

Depending on the type and arrangement of the grasping means and the connection of the means to the sheet the expansion joint need not be one hundred waterproof.

Characteristics of the cover are that it is resilient, flexible, stretchable, bendable, tough, and water proof to the extent that is practical with the cost constraints of construction material. A material suitable for the waterproof sheet is polymer although other types of materials that that have the characteristics required either as inherent properties or by forming and shaping are also suitable. Some of the materials suitable for the waterproof sheet are rubber and plastic and there are other suitable materials known to the person skilled in material selection.

Figure 20:
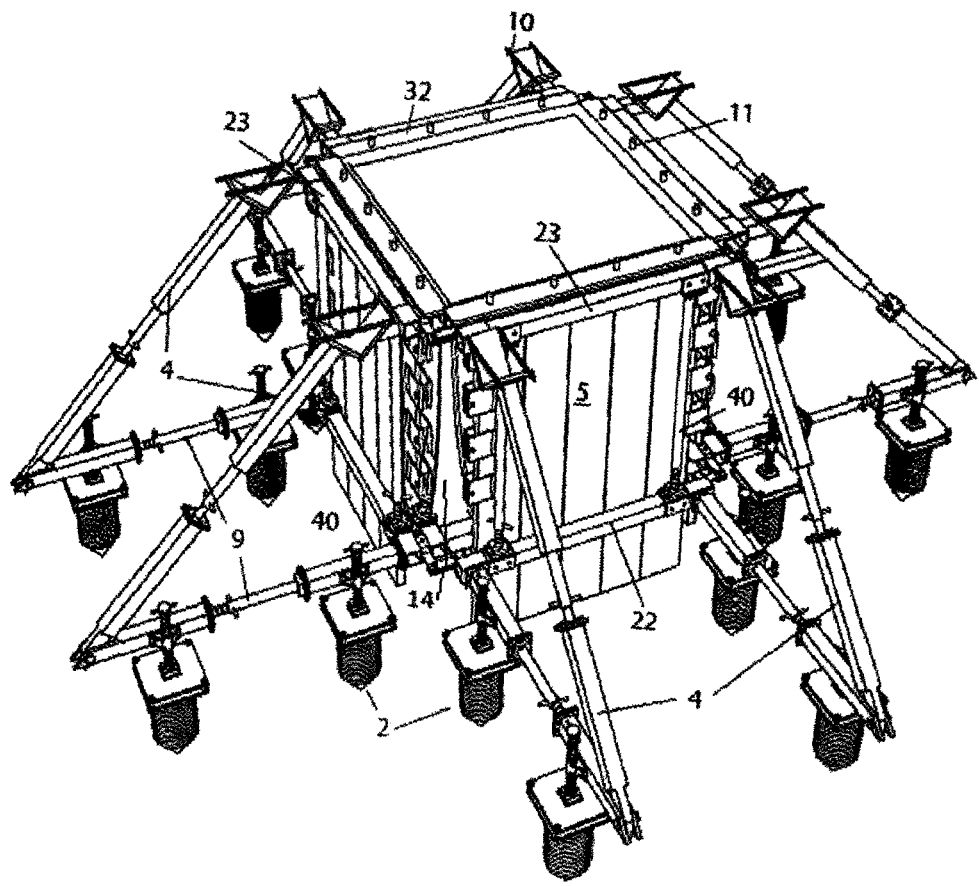
FIG. 20 shows four of the retention devices arranged with their frames forming walls of a box for a holding tank.

FIG. 20 shows a holding tank 32 comprising four retention devices. The lateral edges of the face sections are connected together by expansion joints. Attached to each face section is a mat 7 attached along the long edge of the top of the face section. The mat hangs down like a curtain. The curtain acts as a waterproof wall for retaining flowing or standing liquids. The holding tank 32 is suitable for holding water, petroleum, oil, and other liquids. The holding tank 32 is also suitable for holding snow, earth, rocks, and soil, and other loose stuffs.

Characteristics of the mat are that it is flexible, tough, and water proof to the extent that is practical with the cost constraints of construction material. A material suitable for the waterproof sheet is polymer although other types of materials that that have the characteristics required either as inherent properties or by forming and shaping are also suitable. Some of the materials suitable for the mat are rubber and plastic and there are other suitable materials known to the person skilled in material selection.

FIG. 17 shows a flowing river. The river banks are formed by hanging mats 7 that hang from the long edge of the top of each of several retention devices placed side by side. Mats that are adjacent have lateral edges that overlap. The overlap forms a seal between adjacent mats. Thus the mats form a river bank impervious to the flowing water.

The retention device is also capable of retaining snow as heavy snow banks may be pushed up against the face by a snow plough or by drifting snow. The retention device is also capable of retaining solid ground such as embankments and for resisting landslides.

Any liquid or loose stuff held by the tank shown in FIG. 20 has hydrostatic pressure that presses against the mats forming the walls of the tank. The water flowing in the river shown in FIG. 17 has pressure that presses against the mats forming the river banks.

The face sections that suspend the mats also provide the skeletal structure that restrains the mats against pressures exerted by liquids and loose stuffs.

By loose stuff is meant any material that cannot hold its shape or position without being retained by the face section 8 of the retention device. Loose stuff is a free flowing material. Liquid is a free flowing material.

The mat presses against the bottom horizontal bar of the face section, the top horizontal bar of the face section and also the upstanding supports of the face section. The mat 7 also presses against the barrier 5 comprised of slats 51 restrained within the channel 50. The invention has been described by way of examples only and it will be appreciated that variation may be made to the above-mentioned embodiments without departing from the scope of invention.

With respect to the above description then, it is to be realised that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

INDEX OF LABELLED FEATURES IN FIGURES

| Feature | Number |
| --- | --- |
| adjustable angled portion (with extension means 41) | 4 |
| adjustable angled portion - extension means | 41 |
| base - adjustable strut | 9 |
| base - adjustable strut - extension means | 91 |
| base = jacking mechanism | 201 |
| brace (=4 & 9 & 6 & 10) | 3 |
| expansion joint - cover = flexible sheet | 14 |
| expansion joint - cover = flexible bottom | 15 |
| expansion joint - cover - intermediate extender | 16 |
| expansion joint - gap between frame lateral edges | 25 |
| expansion joint - grips for sheet lateral edge | 18 |
| face section | 8 |
| face section - bottom horizontal bar | 22 |
| face section - top horizontal bar | 23 |
| face section - top horizontal bar - fastener studs | 11 |
| face section - upstanding supports | 20, 40 |
| face section - upstanding supports - channels | 50 |
| face section - upstanding supports - channels - barrier | 5 |
| face section - upstanding supports - channels - barrier - slats | 51 |
| face section - upstanding supports - screw jack - height adjusting means | 21 |
| foundations | 2 |
| hinge connects base adjustable strut to adjustable angled portion of brace | 6 |
| holding tank | 32 |
| joint - flange | 26 |
| joint - pad | 27 |
| mat | 7 |
| mat - flexible bottom | 38 |
| mat - intermediate extenders | 16 |
| mat - overlap of adjacent | 29 |
| mat - top | 30 |
| mat - top edge | 31 |
| stress bearing section - angle plate | 80 |
| stress bearing section - face plate | 12 |
| stress bearing section - link | 13 |
| stress bearing section -low stress hinge | 70 |
| stress bearing section | 10 |

The invention claimed is:

1. A retention device for retaining movement of liquids or loose materials, comprising:
   a face section providing a wall to retain movement of the liquids or loose materials, the face section being connected substantially perpendicular to a base mounted on a foundation anchor and being height adjustable relative to the base by adjustment of a length of the face section; and
   a length adjustable angled portion for bracing the face section against force applied by the liquids or loose materials to the face section, the length adjustable angled portion having an angle plate at one end and being linearly extendable to different lengths and pivotally connected to the base by a first hinge, the length adjustable angled portion being pivotally connected to the face section via the angle plate by a combination of a second hinge and a link, the link being offset from the second hinge and being configured to accommodate different angles of the angle plate and the length adjustable angled portion relative to the face section, so that when the length of the face section is adjusted, the angle plate and the length adjustable angled portion pivot and a length of the length adjustable angled portion is adjusted to accommodate the adjusted length of the face section.

2. The retention device according to claim 1, comprising:
an elevation adjustment means for adjusting the relative elevation and orientation of the face section with respect to the foundation anchor.

3. The retention device according to claim 2, wherein:
the elevation adjustment means is a screw jack connecting the base to the foundation anchor.

4. The retention device according to claim 1, wherein the face section comprises:
a bottom horizontal bar fixed to the base;
a top horizontal bar aligned substantially parallel to the bottom horizontal bar; and
lateral sides comprising upstanding supports which are length adjustable and connected between the top horizontal bar and the bottom horizontal bar so as to make the face section height adjustable by adjusting the length of the upstanding supports.

5. The retention device according to claim 1, further comprising:
a barrier suitable as a wall against the liquids or loose materials;
wherein the face section comprises a channel for receiving and supporting the barrier.

6. The retention device according to claim 5, wherein the barrier is comprised of:
a plurality of slats.

7. The retention device according to claim 1, wherein:
the face section has lateral sides comprising a means for grasping an edge of a cover that is flexible and suitable for an expansion joint.

8. The retention device according to claim 1, wherein the face section comprises:
a mat; and
suspension means near a top of the face section from which to hang the mat as a curtain suitable as a wall against the liquids or loose materials.

9. The retention device of claim 1, wherein the length adjustable angled portion comprises a first part and a second part; and
Wherein the length adjustable angled portion is linearly extendable by axial movement of the second part relative to the first part.

10. The retention device of claim 9, wherein the first and second parts are coaxial.

11. The retention device of claim 1, wherein the length adjustable angled portion comprises a first part and a second part connected via a length adjusting mechanism, the second part extending in a desired direction and being linearly extendable in the desired direction using the length adjusting mechanism.

12. The retention device of claim 1, wherein the link comprises an arm which extends between the face section and the length adjustable angled portion.

13. The retention device of claim 12, wherein the arm is pivotally connected to the face section.

14. The retention device of claim 13, wherein the arm has a plurality of attachment points spaced apart along the arm, and the arm is connected to the length adjustable angled portion at one of the attachment points.

15. The retention device of claim 12, wherein the arm is pivotally connected to the length adjustable angled portion.

16. The retention device of claim 15, wherein the arm has a plurality of attachment points spaced apart along the arm, and the arm is connected to the face section at one of the attachment points.

17. The retention device of claim 12, wherein the arm is one of a pair of arms which extend between the face section and the length adjustable angled portion.

18. The retention device of claim 12, wherein the face section includes a face plate, and wherein the angle plate and the face plate are pivotally connected by the second hinge and the arm.

19. The retention device of claim 18, wherein the arm extends between the face plate and the angle plate such that the arm and the plates form a triangular arrangement.

20. The retention device of claim 1, wherein the face section includes an intermediate support, the length adjustable angled portion being pivotally connected to the intermediate support of the face section.

21. A system comprising a plurality of retention devices according to claim 1, wherein:
the face section of each retention device has a lateral side arranged substantially parallel with and joined to a lateral side of an adjacent face section.

22. The system according to claim 21, wherein each retention device comprises:
an elevation adjustment means for adjusting the relative orientation of the lateral side with respect to the foundation anchor so as to arrange the lateral side substantially parallel with a lateral side of an adjacent face section.

23. The system according to claim 21, wherein:
the lateral sides of adjacent face sections are separated by a gap and the lateral sides are joined by an expansion joint comprising a cover in the form of a flexible sheet that covers the gap.

24. The system according to claim 21, wherein:
some of the adjacent face sections are arranged substantially parallel to each other so as to form a substantially straight section of a wall with a width of the joined substantially parallel face sections; and
wherein other adjacent face sections are arranged non-parallel to each other so as to form a section of the wall which is not straight.

25. The system according to claim 21, wherein:
the adjacent face sections are arranged to form an enclosure suitable for use as a holding tank.

* * * * *